US008825079B2

(12) United States Patent
Mitsuya et al.

(10) Patent No.: US 8,825,079 B2
(45) Date of Patent: Sep. 2, 2014

(54) INFORMATION PROCESSING APPARATUS, INFORMATION PROCESSING METHOD, INFORMATION PROCESSING SYSTEM, AND COMPUTER PROGRAM PRODUCT

(75) Inventors: Koshiro Mitsuya, Chiba (JP); Atsushi Shionozaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/811,805

(22) PCT Filed: Aug. 24, 2011

(86) PCT No.: PCT/JP2011/004685
§ 371 (c)(1),
(2), (4) Date: Jan. 23, 2013

(87) PCT Pub. No.: WO2012/032724
PCT Pub. Date: Mar. 15, 2012

(65) Prior Publication Data
US 2013/0122931 A1    May 16, 2013

(30) Foreign Application Priority Data

Sep. 9, 2010  (JP) ................................. 2010-202197

(51) Int. Cl.
*H04W 24/00*    (2009.01)
(52) U.S. Cl.
USPC ........................................ 455/456.1; 455/561
(58) Field of Classification Search
USPC ............................ 455/456.1–457, 404.2, 561
See application file for complete search history.

(56) References Cited

U.S. PATENT DOCUMENTS

| 8,219,112 | B1 * | 7/2012 | Youssef et al. | 455/456.1 |
| 2006/0240840 | A1 | 10/2006 | Morgan et al. | |
| 2007/0121560 | A1 * | 5/2007 | Edge | 370/338 |
| 2007/0191022 | A1 * | 8/2007 | Yanagihara | 455/456.1 |
| 2009/0168674 | A1 * | 7/2009 | Strutt et al. | 370/310 |

(Continued)

FOREIGN PATENT DOCUMENTS

| EP | 2 073 562 A1 | 6/2009 |
| JP | 2008-104029 A | 5/2008 |

(Continued)

OTHER PUBLICATIONS

U.S. Appl. No. 13/817,625, filed Feb. 19, 2013, Mitsuya, et al.
Written Opinion of the International Searching Authority mailed on Sep. 27, 2011 in International Application No. PCT/JP2011/004685.
Extended European Search Report issued Nov. 26, 2013 in Patent Application No. 11823205.7.

*Primary Examiner* — Daniel Lai
(74) *Attorney, Agent, or Firm* — Oblon, Spivak, McClelland, Maier & Neustadt, L.L.P.

(57) ABSTRACT

An information processing apparatus includes a reception unit receiving measurement information on signal strength from a wireless terminal that measures the signal strength of wireless signals transmitted from base stations, a base station information storage unit storing, for each base station, base station position information and an index showing the reliability of the base station position information, a base station position estimating unit estimating position information of a base station based on the received measurement information, an estimation result evaluating unit calculating an index showing the reliability of the estimated position information of the base station, and an information management unit operable when the calculated index shows higher reliability than the index stored in the base station information storage unit, to update the stored base station position information using the position information estimated by the base station position estimating unit.

17 Claims, 19 Drawing Sheets

(56) References Cited

U.S. PATENT DOCUMENTS

| | | |
|---|---|---|
| 2010/0093368 A1 | 4/2010 | Meyer et al. |
| 2012/0142366 A1 * | 6/2012 | De Castro Riesco et al. ................ 455/456.1 |
| 2012/0184295 A1 | 7/2012 | Mitsuya et al. |

FOREIGN PATENT DOCUMENTS

| | | |
|---|---|---|
| JP | 2008-104029 A5 | 5/2008 |
| JP | 2009-42045 | 2/2009 |
| JP | 2009-042045 A | 2/2009 |
| WO | 03/058965 A2 | 7/2003 |

* cited by examiner

| MEASUREMENT POSITION INFORMATION | MEASUREMENT TIME | BASE STATION ID | SIGNAL STRENGTH INFORMATION |
|---|---|---|---|
| MEASUREMENT POSITION INFORMATION 1 | 2010/7/20 10:44:56 | 30A | -90dBm |
| | | 30B | -70dBm |
| | | 30C | -80dBm |
| | | ⋮ | ⋮ |

Fig. 4

| BASE STATION ID | POSITION INFORMATION | ESTIMATION ERROR |
|---|---|---|
| 30A | POSITION INFORMATION A | 45m |
| 30B | POSITION INFORMATION B | 30m |
| 30C | POSITION INFORMATION C | 250m |
| ⋮ | ⋮ | ⋮ |

Fig. 5

| MEASUREMENT POSITION INFORMATION | MEASUREMENT TIME | BASE STATION ID | SIGNAL STRENGTH INFORMATION |
|---|---|---|---|
| MEASUREMENT POSITION INFORMATION 1 | 2010/7/20 10:44:56 | 30A | -90dBm |
| | | 30B | -70dBm |
| | | 30C | -80dBm |
| | | ⋮ | ⋮ |
| MEASUREMENT POSITION INFORMATION 2 | 2010/7/20 12:20:22 | 30A | -70dBm |
| | | 30B | -80dBm |
| | | 30D | -70dBm |
| | | ⋮ | ⋮ |
| ... | ... | ... | ... |
| | | ... | ... |
| | | ... | ... |
| | | ⋮ | ⋮ |

Fig. 11

| BASE STATION ID | POSITION INFORMATION | ESTIMATION ERROR |
|---|---|---|
| 30A | ESTIMATED POSITION INFORMATION 2 | 40m |
| 30B | POSITION INFORMATION B | 30m |
| 30C | POSITION INFORMATION C | 250m |
| ⋮ | ⋮ | ⋮ |

| REPORT TIME | LOW RELIABILITY BASE STATION ID |
|---|---|
| 2010/7/14 10:34:56 | 30A |
| 2010/7/15 13:20:24 | 30X |
| 2010/7/15 20:30:11 | 30A |
| 2010/7/17 8:40:54 | 30A |
| 2010/7/18 13:10:22 | 30Y |
| 2010/7/18 20:43:14 | 30A |
| ⋮ | ⋮ | ature
INFORMATION PROCESSING APPARATUS, INFORMATION PROCESSING METHOD, INFORMATION PROCESSING SYSTEM, AND COMPUTER PROGRAM PRODUCT

TECHNICAL FIELD

The present disclosure relates to an information processing apparatus, an information processing method, an information processing system, and a computer program product.

BACKGROUND ART

Recently, receiver apparatuses capable of receiving wireless signals transmitted from satellites have been installed in moving bodies such as vehicles, mobile telephones, and the like. By using GPS (Global Positioning System) positioning, it is possible to estimate the position of the moving body in which the receiver apparatus is installed. Such position estimating technology that uses a receiver apparatus is an important base technology in a wide range of fields such as navigation, security and entertainment. However, position estimating technology based on GPS positioning requires a long time at startup for supplementary synchronization and is difficult to use inside buildings and underground that are out of range for the wireless signals from satellites.

Also, as disclosed in Japanese Laid-Open Patent Publication No. 2008-104029 for example, a method of estimating the position of a wireless terminal based on the signal strength at the wireless terminal of wireless signals transmitted from base stations on a wireless LAN (Local Area Network) has been proposed. More specifically, it is possible to estimate the position of the wireless terminal based on position information of respective base stations registered in advance and the distances between the base stations and the wireless terminal calculated from the respective signal strengths of the wireless signals. Since base stations on a wireless LAN are also set up inside buildings and underground, by using this method of estimating, it is possible to carry out position estimation inside buildings and underground which has been difficult for position estimating technology based on GPS positioning.

CITATION LIST

Patent Literature
PTL 1: JP 2008-104029A

SUMMARY

Technical Problem

However, a case can be imagined where, due to movement of the base station or the like, the registered base station position information is erroneous. Accordingly, there is concern that the precision of position estimation carried out based on such erroneous base station position information will fall. Such concern has significantly increased in recent years due to the spread of mobile base stations that are carried by the user.

The present disclosure aims to provide a novel and improved information processing apparatus, information processing method, information processing system, and program that are capable of progressively updating base station position information to values with higher reliability.

According to the present disclosure, an information processing apparatus includes a base station position estimating unit that estimates position information of a base station based on signal strength measurement information collected from wireless signals transmitted from a plurality of base stations;

an estimation result evaluating unit that determines a determined index corresponding to reliability of an estimated position information for the base station; and an information management unit configured to update a stored base station position information using the estimated position information when the determined index indicates a higher reliability than a stored index for the base station.

According to one aspect, the apparatus also includes a reception unit that receives from a wireless terminal signal strength measurement information; and a base station information storage unit that stores for the base station the stored base station position information, and
the stored index.

A feature of the apparatus is that the information management unit is configured to lower the stored index lower to indicate lower reliability when a difference between the estimated position information and stored base station position information exceeds a predetermined value.

According to another aspect the apparatus includes a measurement information storage unit that stores the signal strength measurement information received by the reception unit.

Another feature is that the base station position estimating unit refers to the measurement information storage unit and estimates the estimated position information of the base station based on magnitudes of signals strengths of wireless signals received by the reception unit.

Another feature is that the estimation result evaluating unit calculates an average of the signal strengths of the wireless signals.

The apparatus may also include a history information storage unit that stores history information for base stations having changes to the stored index to reflect lowered reliability;

a mobile base station determining unit that determines whether the base station is a mobile base station based on the history information; and a mobile base station information storage unit that stores information regarding base stations that have been determined by the mobile base station determining unit to be mobile base stations.

According to another aspect the mobile base station determining unit determines that the base station is a mobile base station where the reliability of the stored index has been lowered with a specified frequency or made higher.

Optionally the apparatus includes a terminal position estimating unit that estimates a position of a wireless terminal based on measurement information received from the wireless terminal and the stored base station position information, wherein the terminal position estimating unit estimates the position of the wireless terminal using measurement results of base stations where the reliability exceeds a predetermined threshold.

According to one feature the terminal position estimating unit estimates the position of the wireless terminal using measurement results of base stations whose reliability exceeds the threshold and are not stored as mobile base stations in the mobile base station information storage unit.

According to another feature the information management unit is configured to lower the stored index to the predetermined threshold or below when a difference between an estimated position of the base station and a position shown by the base station position information stored in the base station information storage unit exceeds a set value.

A method embodiment includes estimating position information of a base station based on signal strength measurement information collected from wireless signals transmitted from a plurality of base stations;

determining with a processor a determined index corresponding to reliability of an estimated position information for the base station; and updating in a computer readable storage device a stored base station position information using the estimated position information when the determined index indicates a higher reliability than a stored index for the base station.

The method may also include receiving from a wireless terminal signal strength measurement information; and storing in a base station information storage unit the stored base station position information, and the stored index.

According to an aspect of the method, the method involves changing the stored index lower to indicate lower reliability when a difference between the estimated position information and stored base station position information exceeds a predetermined value.

According to an aspect of the method, the method involves the estimating includes estimating the estimated position information of the base station based on magnitudes of signals strengths described by the signal strength measurement information.

The method also optionally includes storing history information for base stations having changes to the stored index to reflect lowered reliability;

determining whether the base station is a mobile base station based on the history information; and storing information regarding base stations that have been determined to be mobile base stations.

According to a computer readable storage device embodiment having instructions that when executed by a processor perform a method, the method including estimating position information of a base station based on wireless terminal signal strength measurement information of wireless signals transmitted from a plurality of base stations;

determining with a processor a determined index corresponding to an estimated position information for the base station; and updating in a computer readable storage device a stored base station position information using the estimated position information when the determined index indicates a higher reliability than a stored index for the base station.

The method may also include receiving from a wireless terminal signal strength measurement information; and storing in a base station information storage unit the stored base station position information, and the stored index.

The method may also include changing the stored index lower to indicate lower reliability when a difference between the estimated position information and stored base station position information exceeds a predetermined value.

One aspect is that according to the method the estimating includes estimating the estimated position information of the base station based on magnitudes of signals strengths described by the signal strength measurement information.

Advantageous Effects of Invention

According to embodiments of the present disclosure described above, it is possible to progressively update base station position information to highly reliable values.

BRIEF DESCRIPTION OF DRAWINGS

FIG. 4 is a diagram useful in explaining specific examples of base station information stored by a base station information storage unit.

FIG. 5 is a diagram useful in showing specific examples of measurement information stored by a measurement information storage unit.

FIG. 11 is a diagram useful in explaining an example of updating the base station information stored by the base station information storage unit.

DESCRIPTION OF EMBODIMENTS

Figures 1, 2:
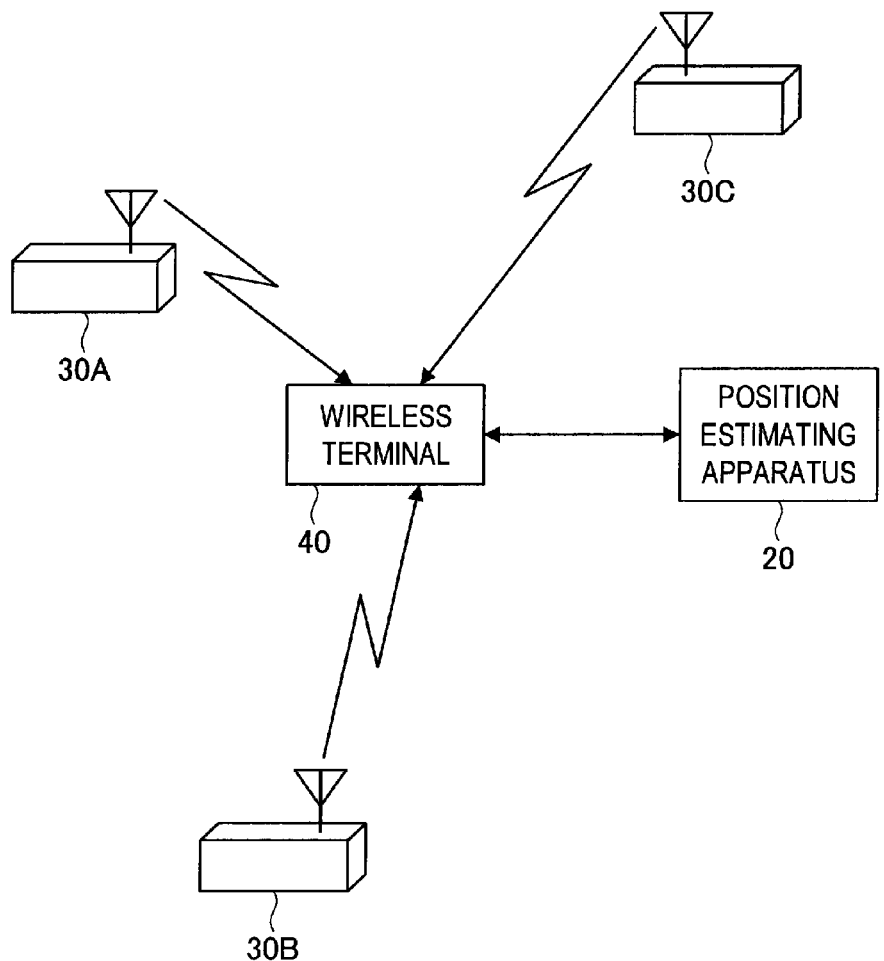
FIG. 1 is a diagram useful in explaining the configuration of an information processing system according to embodiments of the present disclosure.
FIG. 2 is a diagram useful in explaining specific examples of measurement information.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, in the present specification and drawings, in some cases a plurality of structural elements that have effectively the same functional configuration are distinguished from one another by appending different letters to the same reference numeral. For example, a plurality of structural elements with effectively the same functional configuration are distinguished as necessary as the "base stations 30A, 30B, and 30C". However, when it is not especially necessary to distinguish between the plurality of structural elements with effectively the same functional configuration, the same reference numeral is used. For example, the base stations 30A, 30B, and 30C are referred to simply as the "base station 30" when it is not especially necessary to distinguish between them.

Embodiments of the present disclosure will now be described in the order indicated below.

1. Fundamental Configuration of Information Processing System
2. First Embodiment: Updating Base Station Position Information in Accordance With Comparison Result for New and Old Estimation Errors
  2-1. Configuration of Position Estimating Apparatus According to First Embodiment
  2-2. Operation of Position Estimating Apparatus According to First Embodiment
3. Second Embodiment: Amendment of Estimation Error
  3-1. Configuration of Position Estimating Apparatus According to Second Embodiment
  3-2. Operation of Position Estimating Apparatus According to Second Embodiment
    First Example Operation
    Second Example Operation
    Third Example Operation
4. Third Embodiment: Position Estimation of Wireless Terminal
  4-1. Configuration of Position Estimating Apparatus According to Third Embodiment
  4-2. Operation of Third Embodiment
5. Fourth Embodiment: Determining Mobile Base Stations
  5-1. Configuration of Position Estimating Apparatus According to Fourth Embodiment
  5-2. Operation of Position Estimating Apparatus According to Fourth Embodiment
6. Fifth Embodiment: Implementing Functions in Mobile Terminal
7. Conclusion

1. Fundamental Configuration of Information Processing System

As described in detail below in the "2. First Embodiment" to "6. Fifth Embodiment" sections for example, the present disclosure has a variety of possible implementations.

The "position estimating apparatus 20" or "wireless terminal 40" according to such embodiments includes:

(1) a base station information storage unit (216, 416) that stores, for each base station, base station position information and an index (estimation error) showing the reliability of the base station position information;

(2) a base station position estimating unit (224, 424) that estimates position information of a base station based on measurement information for the signal strength of a wireless signal transmitted from the base station;

(3) an estimation result evaluating unit (estimation error calculating unit 228, 428) that calculates an index showing the reliability of the position information of a base station estimated by the base station position estimating unit; and (4) an information management unit 232 (232, 234, 432) that updates the base station position information stored in the base station information storage unit using the position information estimated by the base station position estimating unit when the index calculated by the estimation result evaluating unit indicates higher reliability than the index stored in the base station information storage unit.

First, the fundamental configuration that is common to the respective embodiments will be described with reference to FIGS. 1 and 2.

Configuration of Information Processing System

FIG. 1 is a diagram useful in explaining the configuration of an information processing system 1 according to the embodiments of the present disclosure. As shown in FIG. 1, the information processing system 1 according to the embodiments of the present disclosure includes a position estimating apparatus 20 (information processing apparatus), a plurality of base stations 30, and a wireless terminal 40.

Each base station 30 controls communication between communication apparatuses that are spatially distributed. As examples, the base stations 30 are capable of controlling wireless communication between the wireless terminal 40 and another wireless terminal (not shown) that are both located in the respective signal ranges of the base stations 30 and/or controlling communication between the wireless terminal 40 and a communication apparatus that is connected by wires to a base station 30. More specifically, the base stations 30 may be base stations on a wireless LAN (Local Area Network) based on WiFi (Wireless Fidelity) Standard, LTE (Long Term Evolution) base stations, GSM (Global System for Mobile Communications) base stations, or Bluetooth (registered trademark) base stations.

In addition, the base stations 30 form a wireless network by regularly transmitting a beacon signal, for example. Here, the expression "beacon signal" includes a beacon signal including a base station ID identifying each base station 30. This means that it is possible for the wireless terminal 40 to specify the base station 30 that transmitted a beacon signal that has been received from the base station ID included in the beacon signal.

The wireless terminal 40 is capable of wirelessly transmitting and receiving various data in accordance with control by the base stations 30. For example, the wireless terminal 40 is capable of receiving content data from a content distribution server (not shown) and/or transmitting and receiving electronic mail to or from another wireless terminal via the base stations 30. Note that various data, for example, audio data (such as music, a performance, or a radio program), image data (such as a movie, a television program, a video program, photographs, artwork, or drawings), games, and software, can be given as examples of the content data.

As examples, the wireless terminal 40 may be an information processing apparatus such as a PC (personal computer), a home video processing apparatus (a DVD recorder, video deck, or the like), a mobile telephone, a PHS (Personal Handyphone System), a mobile music player, a mobile video processing apparatus, a PDA (Personal Digital Assistant), a home game console, a mobile game console, or a home appliance.

When a wireless signal (for example, a beacon signal) transmitted from a base station 30 is received, the wireless terminal 40 is also capable of measuring the signal strength of such wireless signal. The wireless terminal 40 transmits measurement information including information on the measured signal strength, the base station ID of the base station 30, and measurement position information showing the measurement position to the position estimating apparatus 20. A specific example of the measurement information will now be described with reference to FIG. 2.

FIG. 2 is a diagram useful in explaining a specific example of the measurement information. As shown in FIG. 2, the measurement information includes measurement position information, a measurement time, and signal strength information for each base station. Note that in the present specification, for ease of explanation, it is assumed that the code assigned to each base station and the base station ID are the same.

As mentioned earlier, the measurement position information is information showing a measurement position for wireless signals. When the wireless terminal 40 includes a position estimating function such as GPS, the measurement position information may be estimated using such position estimating function. Another conceivable implementation would be for the user of the wireless terminal 40 to input the measurement position information. As other examples, the measurement position information may be obtained by a method that uses base station information for mobile telephones or a method that uses various sensors.

Although the measurement position information is shown in simplified form in FIG. 2, the measurement position information may be expressed by a format using latitude and longitude, a format using x and y coordinates, a format using absolute coordinates, or a format using vectors.

Also, although an example where the signal strength information is expressed in "dBm" units is shown in FIG. 2, the embodiments are not limited to the illustrated example. For example, the signal strength information may be expressed by a value, such as "40%" or "80%", that is the measured value expressed as a proportion of a set value (for example, a saturation value for the signal strength).

The signal strength of the wireless signal transmitted by a base station 30 falls in accordance with a specified rule as the distance from the base station 30 increases. That is, the signal strength of the wireless signal at the wireless terminal 40 can be converted into the distance between the base station 30 that transmitted such wireless signal and the wireless terminal 40. In this way, since the signal strength corresponds to the distance between the base station 30 and the wireless terminal 40 estimated from the signal strength, the wireless terminal 40 may treat the distance between the base station 30 and the wireless terminal 40 estimated from the signal strength as signal strength information.

Returning to the description of the information processing system 1 with reference to FIG. 1, the position estimating apparatus 20 (information processing apparatus) estimates position information of the respective base stations 30 based on the measurement information received from the wireless terminal 40. The position estimating apparatus 20 stores position information for the respective base stations 30 and updates the position information for the respective base stations 30 in accordance with estimation results based on the measurement information.

Also, a position estimating apparatus 20-3 according to a third embodiment and a position estimating apparatus 20-4 according to a fourth embodiment are capable, on receiving signal strength information for each base station 30 as a position estimation request from the wireless terminal 40, to estimate position information for the wireless terminal 40 based on the signal strength information and position information of the respective base stations 30 that have been stored in advance.

In addition, when estimating the position of the wireless terminal 40, the position estimating apparatus 20-3 according to the third embodiment and the position estimating apparatus 20-4 according to the fourth embodiment are also capable of selectively using position information of highly reliable base stations 30 to improve the precision of the position estimation. Such embodiments are described in detail later in this specification.

2. First Embodiment

Figure 3:
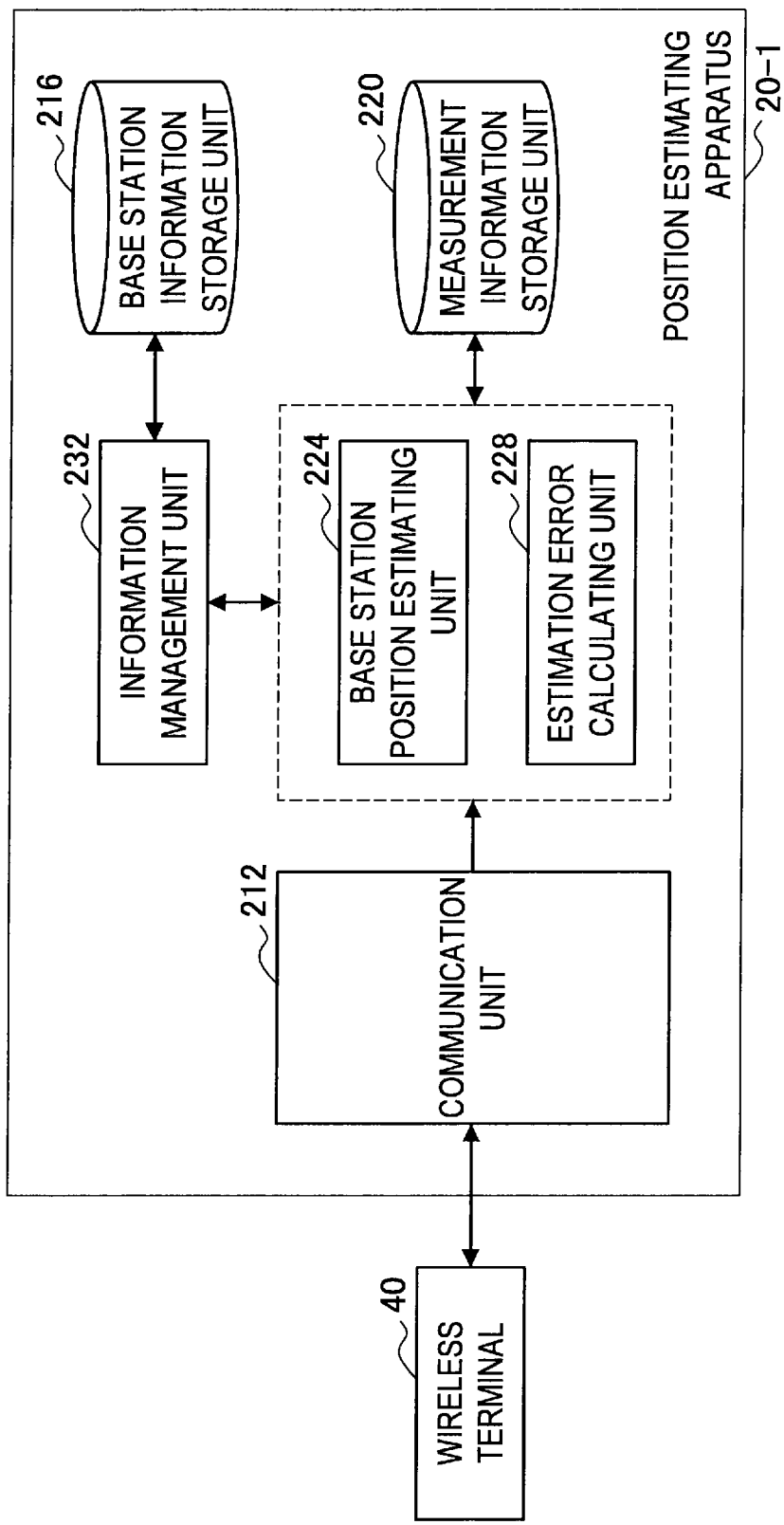
FIG. 3 is a functional block diagram showing the configuration of a position estimating apparatus according to a first embodiment of the present disclosure.

Updating Base Station Position Information in Accordance with Comparison Result for New and Old Estimation Errors 2-1. Configuration of Position Estimating Apparatus According to First Embodiment FIG. 3 is a functional block diagram showing the configuration of a position estimating apparatus 20-1 according to a first embodiment of the present disclosure. As shown in FIG. 3, the position estimating apparatus 20-1 according to the first embodiment includes a communication unit 212, a base station information storage unit 216, a measurement information storage unit 220, a base station position estimating unit 224, an estimation error calculating unit 228, and an information management unit 232.

The communication unit 212 is an interface for transmitting and receiving information to and from a wireless terminal 40. As one example, the communication unit 212 includes a function as a reception unit that receives measurement information from the wireless terminal 40. Note that the communication unit 212 may communicate with the wireless terminal 40 via a communication network that includes wired or wireless transfer paths. More specifically, the communication network may include a public network such as the Internet, a telephone network, or a satellite communication network, various types of LAN (Local Area Network) including Ethernet (registered trademark), a WAN (Wide Area Network), and the like. The communication network may also include a dedicated network such as an IP-VPN (Internet Protocol-Virtual Private Network).

The base station information storage unit 216 stores base station information, which is made up of position information and an estimation error, for each base station 30. Here, the estimation error is an index showing the reliability of the position information of the base station 30 and is set so that the higher the estimation error, the lower the reliability of the position information and the lower the estimation error, the higher the reliability of the position information. Specific examples of the base station information stored in the base station information storage unit 216 will now be described with reference to FIG. 4.

FIG. 4 is a diagram useful in explaining specific examples of the base station information stored by the base station information storage unit 216. As shown in FIG. 4, the base station information of a base station includes a base station ID that identifies such base station, position information, and an estimation error. As one example, the base station information of the base station 30A includes the base station ID "30A", the "position information A", and the estimation error "45 m". Note that the concept and calculation method of the estimation error included in the base station information will be described later with reference to FIGS. 6 to 8.

The measurement information storage unit 220 stores measurement information received by the communication unit 212 from the wireless terminal 40. As described above with reference to FIG. 2, each piece of measurement information includes measurement position information, a measurement time, a base station ID, signal strength information, and the like. As shown in FIG. 5, such measurement information is accumulated in the measurement information storage unit 220. Note that the transmission source (i.e., provider) of the measurement information is not particularly limited to the wireless terminal 40. For example, the terminal that transmitted the measurement information including "measurement position information 1" and the terminal that transmitted the measurement information including "measurement position information 2" shown in FIG. 5 may be the same terminal or may be different terminals. The measurement information may also include a measurer attribute indicating whether the user of the wireless terminal 40 is walking, riding in a vehicle, or the like.

Position Estimation for Base Station

The base station position estimating unit 224 estimates the position information of a given base station 30 based on a plurality of pieces of measurement information relating to such base station 30. For example, the base station position estimating unit 224 may apply a weighting in accordance with the magnitude of the signal strength of the respective measurement information to the respective pieces of measurement position information included in measurement information relating to such base station 30 and use a center of gravity of the weighted measurement position information as an estimate of the position information of the base station 30. The method of estimating the position information of a base station 30 will now be described in more detail with reference to FIG. 6.

Figure 6:
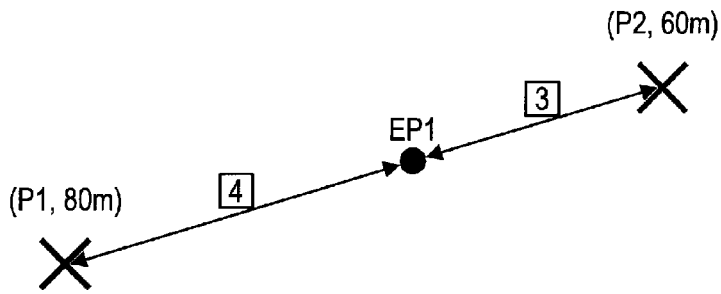
FIG. 6 is a diagram useful in explaining a specific example of estimating a terminal position.

FIG. 6 is a diagram useful in explaining a method of estimating the position information of a base station 30. Here, a case is considered where the position of the base station 30A is estimated based on the two pieces of measurement information shown in FIG. 5. In this case, the base station position estimating unit 224 applies weightings in accordance with the magnitudes of the signal strengths to the measurement position P1 and the measurement position P2 when finding the center of gravity of the measurement position P1 shown by the measurement position information 1 and the measurement position P2 shown by the measurement position information 2.

Note that it is possible to convert the respective signal strengths to distances. For this reason, in FIG. 6, an example is shown where the signal strength "−90 dBm" of the base station 30A at the measurement position P1 has been converted to the distance "80 m" and the signal strength "−70 dBm" of the base station 30A at the measurement position P2 has been converted to the distance "60 m". In this case, the base station position estimating unit 224 may apply weightings in accordance with the converted distance values "80 m" and "60 m" to the measurement position P1 and the measurement position P2.

As a result, the base station position estimating unit 224 can estimate a position EP1 found by dividing the gap between the measurement position P1 and the measurement position P2 in accordance with 4:3 that is the ratio of "80 m" to "60 m" as the position of the base station 30A. In addition, it is possible for the base station position estimating unit 224 to estimate the position of the base station 30 based on a plurality of pieces of measurement information in accordance with the generalized mathematical formulas shown below.

[Math. 1]

$$EP = \frac{1}{V}\sum_{i}(Vi \cdot Pi) \quad \text{(Mathematical Formula 1)}$$

[Math. 2]

$$Vi = \frac{1}{distS(EP, Pi)} \quad \text{(Mathematical Formula 2)}$$

[Math. 3]

$$V = \sum_{i} Vi \quad \text{(Mathematical Formula 3)}$$

Note that "Pi" in Formula 1 shows the $i^{th}$ measurement position information. Accordingly, when the measurement position information is expressed by longitude and latitude, the base station position estimating unit 224 applies Formula 1 to both the longitude and the latitude. Also, as shown in Formula 2, Vi is a weighting coefficient obtained based on distS (EP,Pi) showing the distance between the wireless terminal 40 and the base station 30 estimated from the signal strength. As shown in Formula 3, V is the sum of the weighting coefficients Vi.

Calculation of Estimation Error

As described earlier, the estimated position of a base station 30 is found by the base station position estimating unit 224 estimating the position based on the measurement information. However, in reality a base station 30 will not always be located at the estimated position, and the estimated position is assumed to include some degree of error. Such estimation error will now be described with reference to FIGS. 7 and 8.

Figure 7:
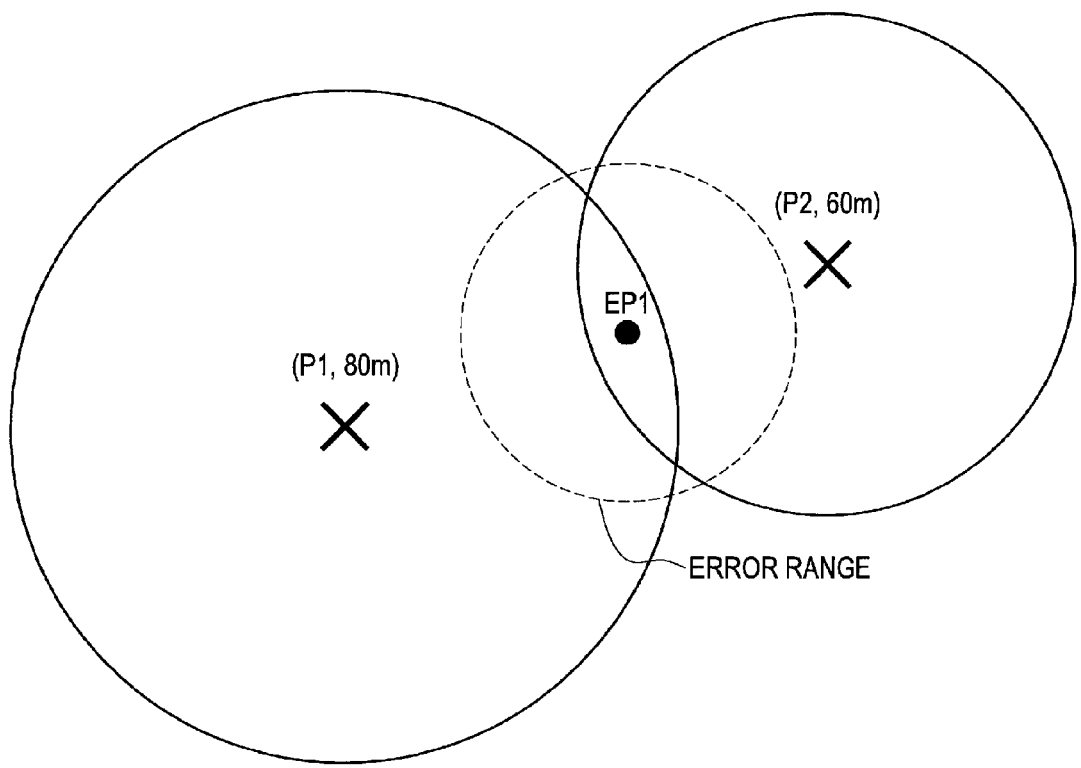
FIG. 7 is a diagram useful in explaining the concept of an estimation error.
Figure 8:
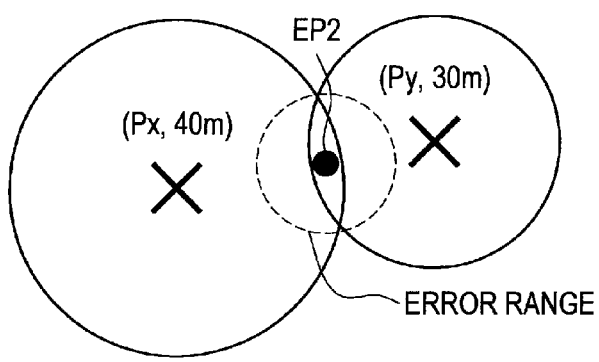
FIG. 8 is a diagram useful in explaining the concept of an estimation error.

FIGS. 7 and 8 are diagrams showing the concept of the estimation error. As shown in FIG. 7, even if the position EP1 of the base station 30 has been estimated by the base station position estimating unit 224, such position EP1 is thought to include an error within the range shown by the broken line, for example.

In the same way, as shown in FIG. 8, in another conceivable case, the position EP2 of a base station 30 is found as an estimate based on the signal strength at the measurement position Px (the converted distance value "40 m") and the signal strength at the measurement position Py (the converted distance value "30 m"). In such case also, in the same way as the example shown in FIG. 7, the position EP2 is thought to include an error within the range shown by the broken line in FIG. 8, for example.

However, as shown in FIG. 8, it is thought that the error included in the position EP2 is smaller than the error included in the position EP1 shown in FIG. 7. This is because the signal strengths at the measurement position Px and the measurement position Py shown in FIG. 8 are greater than the signal strengths at the measurement position P1 and the measurement position P2 shown in FIG. 7, and therefore conceivable to narrow down the position of the base station 30 further.

In this way, the reliability of the position information of the base station 30 estimated by the base station position estimating unit 224 is higher the greater the signal strengths of the signals used for estimation. That is, the estimation error of the position information of the base station 30 estimated by the base station position estimating unit 224 is smaller the greater the signal strengths of the signals used for estimation.

For this reason, the estimation error calculating unit 228 calculates the estimation error of the position information produced by the base station position estimating unit 224 based on the signal strengths of the signals used in estimation or converted distance values calculated from the respective signal strengths. As examples, the estimation error calculating unit 228 may calculate an average of the converted distance values as the estimation error, calculate a median value of the converted distance values as the estimation error, or may treat a largest value out of the converted distance values as the estimation error.

When the average of the converted distance values is calculated as the estimation error, in the example shown in FIG. 7, "70 m" that is the average of the converted distance values "80 m" and "60 m" is calculated as the estimation error. Meanwhile, in the example shown in FIG. 8, "35 m" that is the average of the converted distance values "40 m" and "30 m" is calculated as the estimation error.

Figure 9:
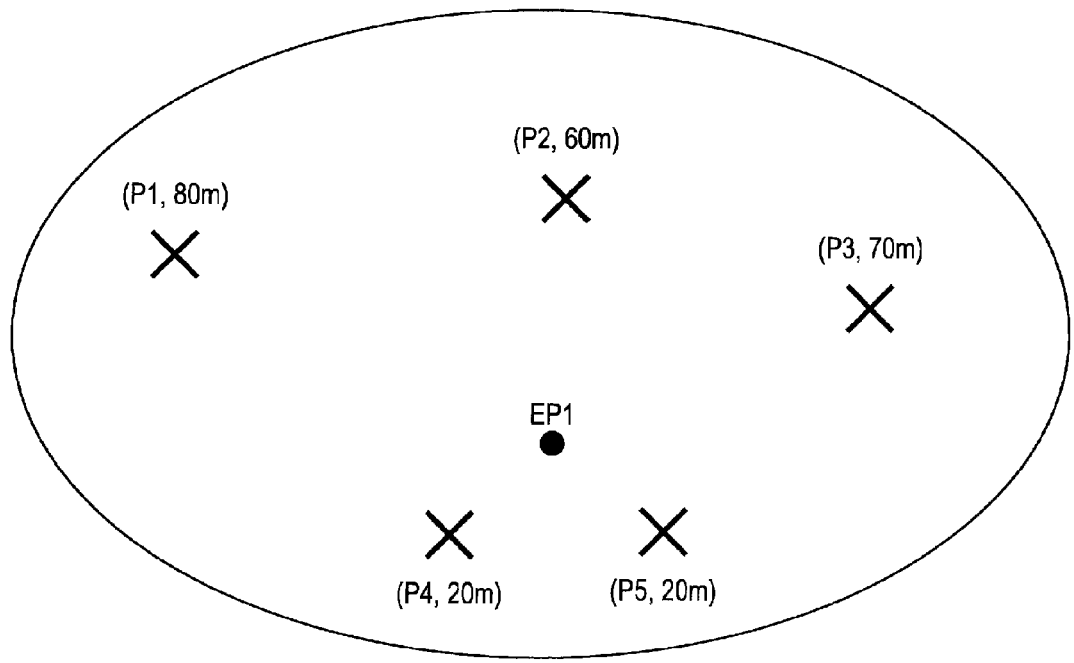
FIG. 9 is a diagram useful in explaining one example of measurement information used when calculating the position information and the estimation error of a base station.

Note that although an example where the base station position estimating unit 224 and the estimation error calculating unit 228 calculate the position information and the estimation error of the base station 30 in question based on two pieces of measurement information has been described above, the present embodiment is not limited to such example. For example, as shown in FIG. 9, the base station position estimating unit 224 and the estimation error calculating unit 228 may calculate the position information and the estimation error based on the most recent five pieces of measurement information relating to the base station 30 in question. In addition, the measurement information used by the base station position estimating unit 224 and the estimation error calculating unit 228 may be limited to measurement information from a specified recent period (for example, within the last three months).

Updating the Base Station Information

The information management unit 232 updates the base station information (i.e., the position information and estimation error) stored in the base station information storage unit 216 in accordance with the estimation result produced by the base station position estimating unit 224 and the calculation result produced by the estimation error calculating unit 228.

More specifically, the information management unit 232 compares the reliability of the position information relating to the base station 30 stored in the base station information storage unit 216 and the position information estimated by the base station position estimating unit 224. That is, the information management unit 232 compares the estimation error relating to the base station 30 in question stored in the base station information storage unit 216 and the estimation error calculated by the estimation error calculating unit 228.

If it has been determined that the new estimation error calculated by the estimation error calculating unit 228 is the smaller, that is, if the reliability of the new position information estimated by the base station position estimating unit 224 is the higher, the information management unit 232 updates the position information and the estimation error stored in the base station information storage unit 216 for the base station 30 in question using the new position information and estimation error. Here, the information management unit 232 may replace the position information and the estimation error relating to the base station 30 in question that are stored in the base station information storage unit 216 with the new position information and estimation error or may update the stored information to intermediate values or the like for both the new and old values. The updating process carried out by the information management unit 232 will now be described in detail with reference to FIG. 4 and FIGS. 9 to 11.

Specific Example of Updating Process

Next, consider a case where the "position information A" and the estimation error "45 m" shown in FIG. 4 are stored in the base station information storage unit 216 relating to the base station 30A and the base station position estimating unit 224 and the estimation error calculating unit 228 calculate the position information and the estimation error based on measurement information relating to the five base stations 30A shown in FIG. 9.

In this case, the base station position estimating unit 224 estimates the position EP1 of the base station 30A in accordance with Formula 1 given above, for example. The estimation error calculating unit 228 calculates the average value "50 m" of the respective converted distance values as the estimation error.

In addition, the information management unit 232 compares the new estimation error "50 m" calculated by the estimation error calculating unit 228 and the estimation error "45 m" stored in the base station information storage unit 216. In this case, it is determined that the estimation error "45 m" stored in the base station information storage unit 216 is the smaller, that is, the "position information A" stored in the base station information storage unit 216 has higher reliability. For this reason, the information management unit 232 does not update the "position information A" and the estimation error "45 m" relating to the base station 30A.

Figure 10:
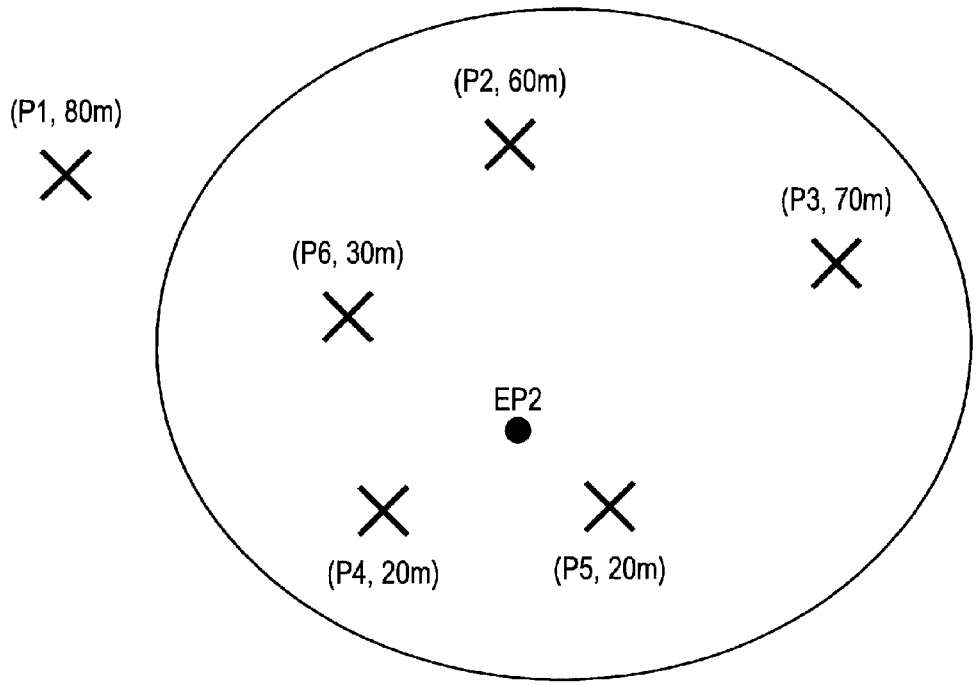
FIG. 10 is a diagram useful in explaining one example of measurement information used when calculating the position information and estimation error of a base station.

After this, assume that the base station position estimating unit 224 and the estimation error calculating unit 228 calculate the position information and the estimation error based on the five pieces of measurement information at the measurement positions P2 to P6 shown in FIG. 10.

In this case, the base station position estimating unit 224 estimates the position EP2 of the base station 30A in accordance with Formula 1 given above, for example. The estimation error calculating unit 228 also calculates the average value "40 m" of the respective converted distance values as the estimation error.

In addition, the information management unit 232 compares the new estimation error "40 m" calculated by the estimation error calculating unit 228 and the estimation error "45 m" stored in the base station information storage unit 216. In such case, it is determined that the new estimation error "40 m" calculated by the estimation error calculating unit 228 is the smaller, that is, the new estimated position EP2 estimated by the base station position estimating unit 224 has higher reliability. For this reason, the information management unit 232 updates the "position information A" and the estimation error "45 m" relating to the base station 30A to the "estimated position information 2" showing the new estimated position EP2 and the new estimation error "40 m" as shown in FIG. 11.

With this configuration, the information management unit 232 is capable of progressively updating the position information of each base station 30 stored in the base station information storage unit 216 to values with higher reliability. As a result, when position estimation of the wireless terminal 40 is carried out based on position information of the respective base stations 30 stored in the base station information storage unit 216, it is possible to improve the precision of the position estimation of the wireless terminal 40.

2-2. Operation of Position Estimating Apparatus According to First Embodiment

The configuration of the position estimating apparatus 20-1 according to the first embodiment of the present disclosure has been described above. Next, the operation of the position estimating apparatus 20-1 according to the first embodiment will be described with reference to FIG. 12.

Figure 12:
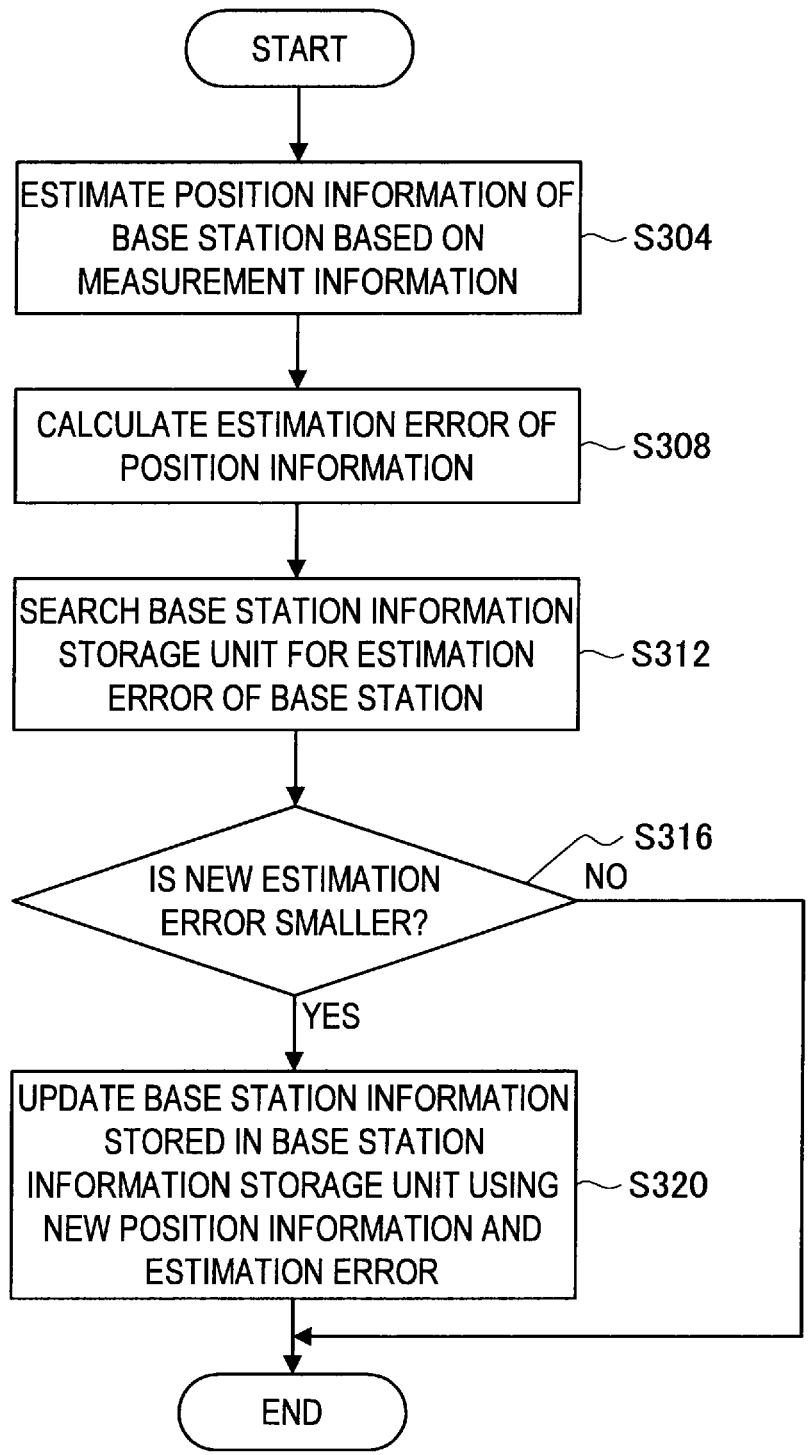
FIG. 12 is a flowchart showing the operation of the position estimating apparatus according to the first embodiment.

FIG. 12 is a flowchart showing the operation of the position estimating apparatus 20-1 according to the first embodiment. First, as shown in FIG. 12, the base station position estimating unit 224 of the position estimating apparatus 20-1 estimates the position information of the base station 30 in question based on the measurement information stored in the measurement information storage unit 220 for such base station 30 (S304).

Next, or alternatively in parallel with the position estimation by the base station position estimating unit 224 shown in S304, the estimation error calculating unit 228 calculates an estimation error of the position information estimated by the base station position estimating unit 224 based on the measurement information used in the position estimation by the base station position estimating unit 224 (S308).

In addition, the information management unit 232 searches the base station information storage unit 216 for the estimation error relating to the base station 30 in question (S312) and compares the found estimation error and the new estimation error calculated by the estimation error calculating unit 228 in S308 (S316).

After this, if the new estimation error is the smaller, the information management unit 232 updates the position information and the estimation error stored in the base station information storage unit 216 using the new position information estimated by the base station position estimating unit 224 in S304 and the new estimation error calculated by the estimation error calculating unit 228 in S308 (S320). Note that if the new estimation error is larger, the information management unit 232 does not update the position information and the estimation error stored in the base station information storage unit 216.

As described above, according to the first embodiment of the present disclosure, it is possible to progressively update the position information of a base station 30 to a more suitable value based on the reliability (i.e., estimation error) of newly estimated position information relating to such base station 30.

3. Second Embodiment

Amendment of Estimation Error

Next, before describing the second embodiment of the present disclosure, the development behind the second embodiment of the present disclosure will be explained.

In recent years, movement of base stations has increased due to the spread of mobile base stations carried by users and the presence of base stations installed in high speed trains. Also, even a base station installed in the user's home could conceivably move, such as when the user moves house. When a base station 30 moves in this way, as shown in FIG. 13, the measurement information relating to such base station 30 also changes.

Figure 13:
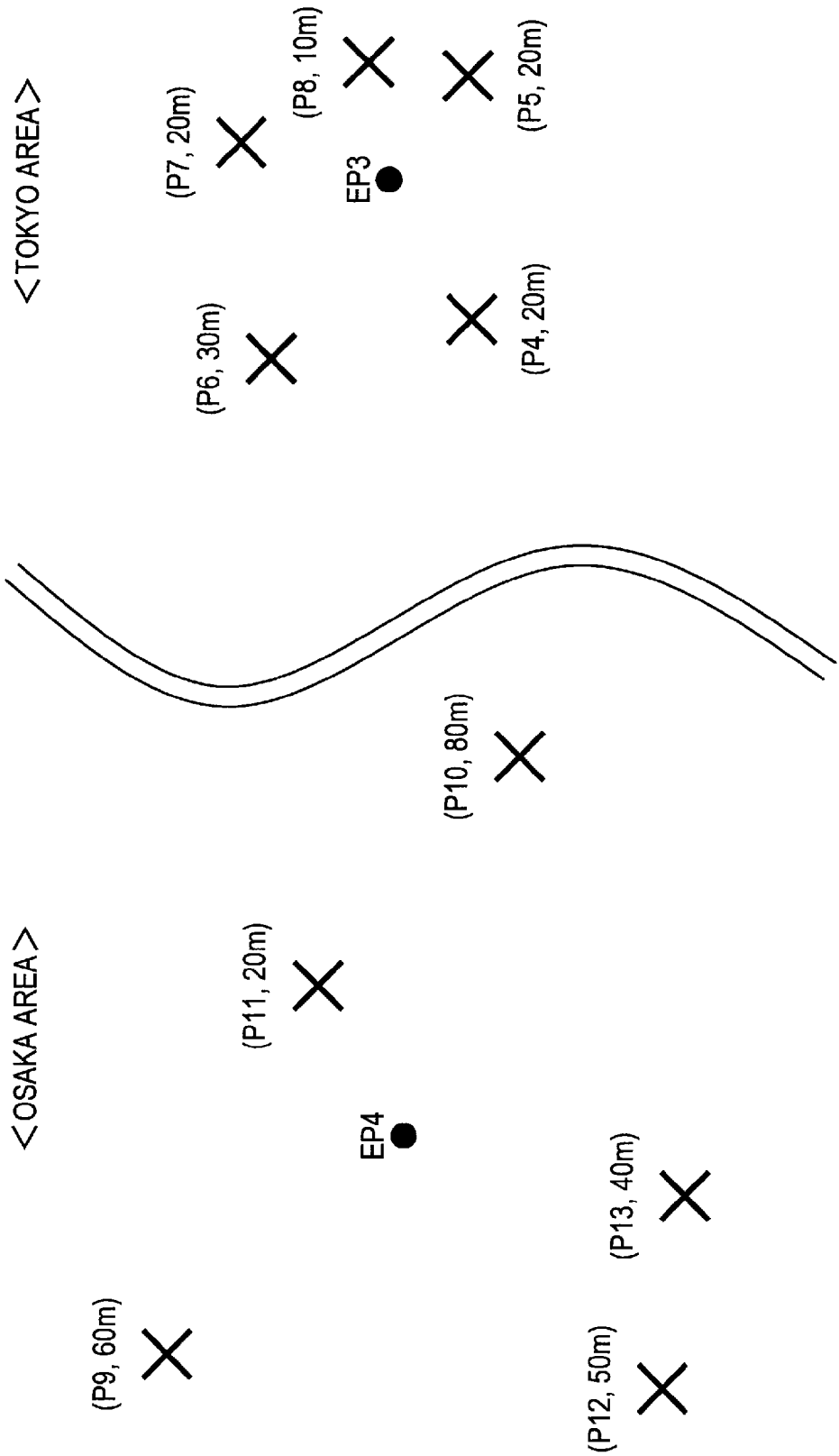
FIG. 13 is a diagram useful in showing changes in the measurement information when a base station has moved.

FIG. 13 is a diagram useful in explaining a change in the measurement information when the base station 30 has moved. As shown in FIG. 13, when a base station 30 located in the Tokyo area has been moved to the Osaka area, the measurement information relating to such base station 30 also changes. For example, as shown in FIG. 13, measurement information is obtained at the measurement positions P4 to P8 before movement of the base station 30 and measurement information is obtained at the measurement positions P9 to P13 after movement of the base station 30.

In such case, since the base station 30 has actually moved to the Osaka area, it is preferable to update the position information EP3 of the base station 30 to the position information EP4 for the Osaka area based on the measurement information at the measurement positions P9 to P13.

Here, the estimation error calculated from the measurement information at the measurement positions P4 to P8 before movement is "20 m" and the estimation error calculated from the measurement information at the measurement positions P9 to P13 after movement is "50 m". This means that with the method described above in the first embodiment, since the estimation error before movement is the smaller, the position information EP3 of the base station 30 will not be updated to the position information EP4 for the Osaka area. That is, according to the method described above in the first embodiment, once the position information of the base station 30 has been estimated with a small estimation error, it will be difficult for the position information to be updated when the base station 30 has moved.

For this reason, the second embodiment of the present disclosure that focuses on this situation was conceived. According to the second embodiment of the present disclosure, it is possible to appropriately update the position information of a base station 30 in keeping with movement of the base station 30. This second embodiment of the present disclosure will now be described in detail.

Figure 14:
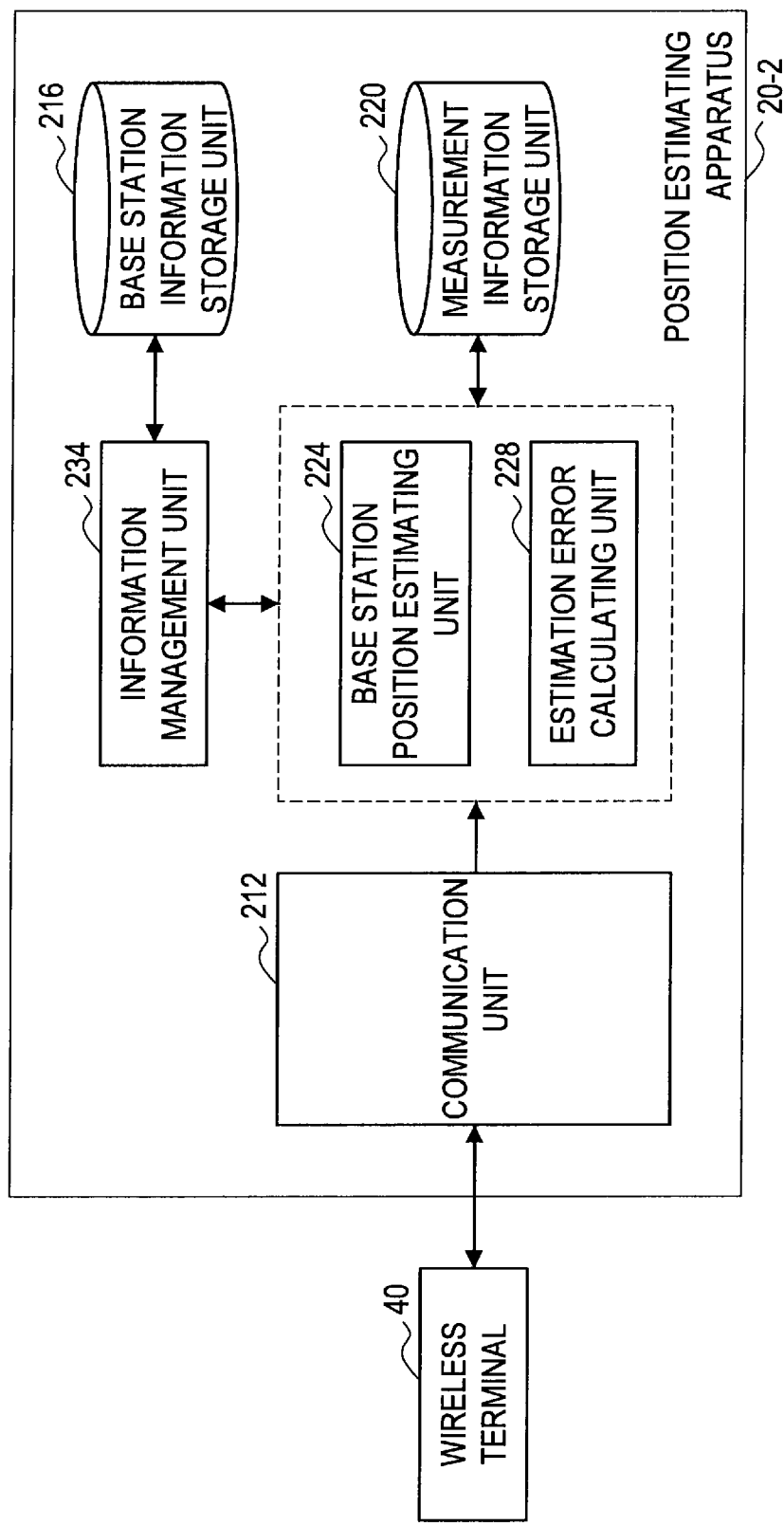
FIG. 14 is a functional block diagram showing the configuration of a position estimating apparatus according to a second embodiment.

3-1. Configuration of Position Estimating Apparatus According to Second Embodiment FIG. 14 is a functional block diagram showing the configuration of a position estimating apparatus 20-2 according to the second embodiment. As shown in FIG. 14, the position estimating apparatus 20-2 according to the second embodiment includes the communication unit 212, the base station information storage unit 216, the measurement information storage unit 220, the base station position estimating unit 224, the estimation error calculating unit 228, and an information management unit 234.

Since the communication unit 212, the base station information storage unit 216, the measurement information storage unit 220, the base station position estimating unit 224, and the estimation error calculating unit 228 are the structural elements described in the first embodiment, detailed description thereof is omitted here.

Meanwhile the information management unit 234 according to the second embodiment is a structural element where additional functions have been implemented in the information management unit 232 described in the first embodiment. The information management unit 234 according to the second embodiment will now be described in detail.

The information management unit 234 determines whether the difference between the estimated position of a base station 30 based on the measurement information received from the wireless terminal 40 and the position shown by the position information stored in the base station information storage unit 216 for such base station 30 exceeds a set value. Here, it is believed that the difference between both positions will exceed the set value when the position information stored in the base station information storage unit 216 has become erroneous due to movement or the like of the base station 30 in question.

Here, if the difference between both positions exceeds the set value, the information management unit 234 lowers the reliability of the position information stored in the base station information storage unit 216 for the base station 30 in question. That is, if the difference between both positions exceeds the set value, the information management unit 234 increases the value of the estimation error stored in the base station information storage unit 216 for the base station 30 in question.

As one example, since the range of WiFi signals is normally said to be around 300 m, the information management unit 234 may amend the estimation error stored in the base station information storage unit 216 to a larger value than 300 m, such as 600 m or 1 Km.

According to this configuration, if the base station 30 has moved after the position information of the base station 30 has been estimated with a small estimation error, the estimation error will be corrected to a larger value by the information management unit 234. As a result, since it becomes easier for a new estimation error calculated by the estimation error calculating unit 228 after movement to be the smaller of the compared values, it becomes possible for the information management unit 234 to update the position information of the base station 30 stored in the base station information storage unit 216 to new position information estimated by the base station position estimating unit 224 after movement.

Specific Example of Amendment of Estimation Error

Here, a specific example of amendment of an estimation error by the information management unit 234 will be described with reference to FIGS. 13 and 15.

Figure 15:
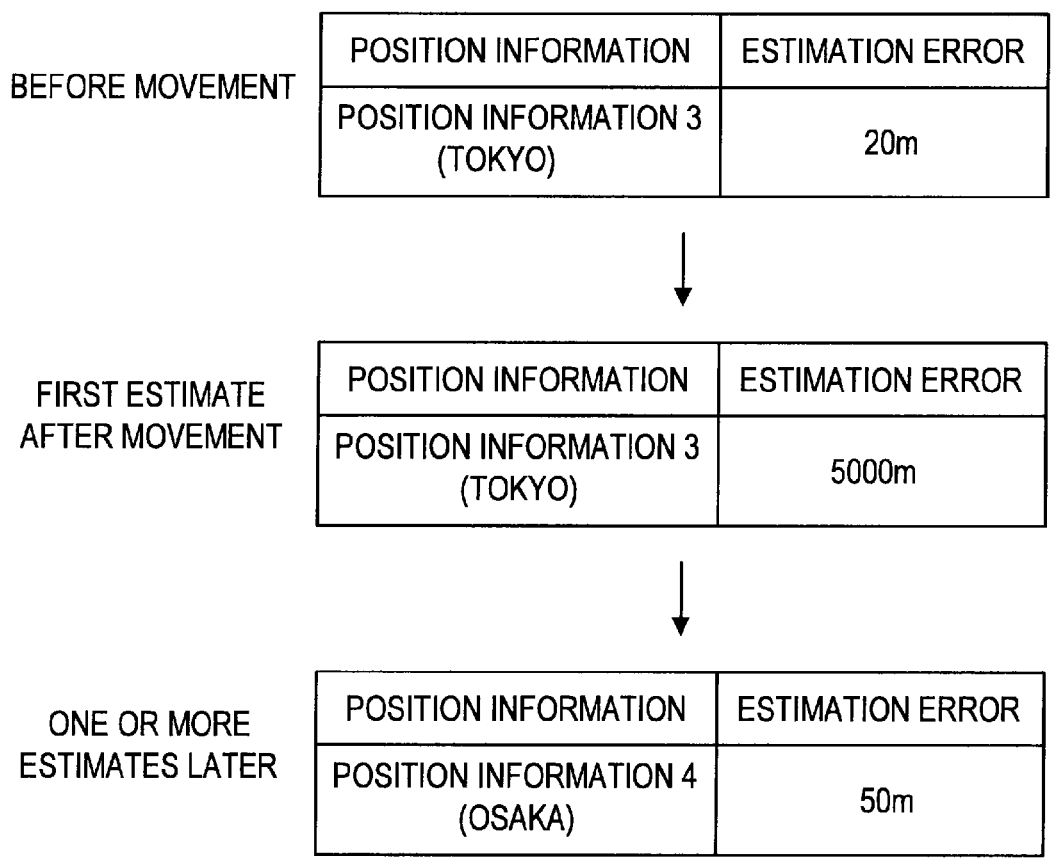
FIG. 15 is a diagram useful in explaining an example of updating the base station information stored by the base station information storage unit.

Here, consider a state where, as shown in FIG. 15, "position information 3 (Tokyo)" showing the estimated position EP3 of a base station 30 and the estimation error "20 m" are stored in the base station information storage unit 216 due to the measurement information for the base station 30 at the measured positions P4 to P8 shown in FIG. 13. If, in this state, the base station 30 is moved from the Tokyo area to the Osaka area and measurement information relating to the base station 30 is obtained at the measurement position P9, the base station position estimating unit 224 will estimate the position of the base station 30 based on the measurement information at the measured positions P5 to P9.

In this case, due to the measurement position P9 being very far from the other measured positions P5 to P8, the difference between the position of the base station 30 estimated by the base station position estimating unit 224 and the position shown by "measurement information 3 (Tokyo)" exceeds the set value. For this reason, as shown in FIG. 15, the information management unit 234 amends the estimation error of the base station 30 to "5000 m", for example. Note that the information management unit 234 does not change the position information of the base station 30 at this time.

After this, once the measurement information at the measurement positions P9 to P13 shown in FIG. 13 has been obtained, based on such measurement information, the base station position estimating unit 224 estimates the position EP4 of the base station 30 and the estimation error calculating unit 228 calculates the estimation error "50 m".

Here, the estimation error "50 m" newly calculated by the estimation error calculating unit 228 is smaller than the estimation error "5000 m" stored in the base station information storage unit 216. For this reason, the information management unit 234 updates the position information stored in the base station information storage unit 216 for the base station 30 to "position information 4 (Osaka)" showing the position EP4 and updates the estimation error to "50 m".

In this way, according to the second embodiment of the present disclosure, when a base station 30 has moved, it is possible to update the position information stored in the base station information storage unit 216 for the base station 30 to a suitable value based on measurement information at positions near the new position after movement.

3-2. Operation of Position Estimating Apparatus According to Second Embodiment

The configuration of the position estimating apparatus 20-2 according to the second embodiment of the present disclosure has been described above. Next, example operations of the position estimating apparatus 20-2 according to the second embodiment will be described with reference to FIGS. 16 to 18.

First Example Operation

Figure 16:
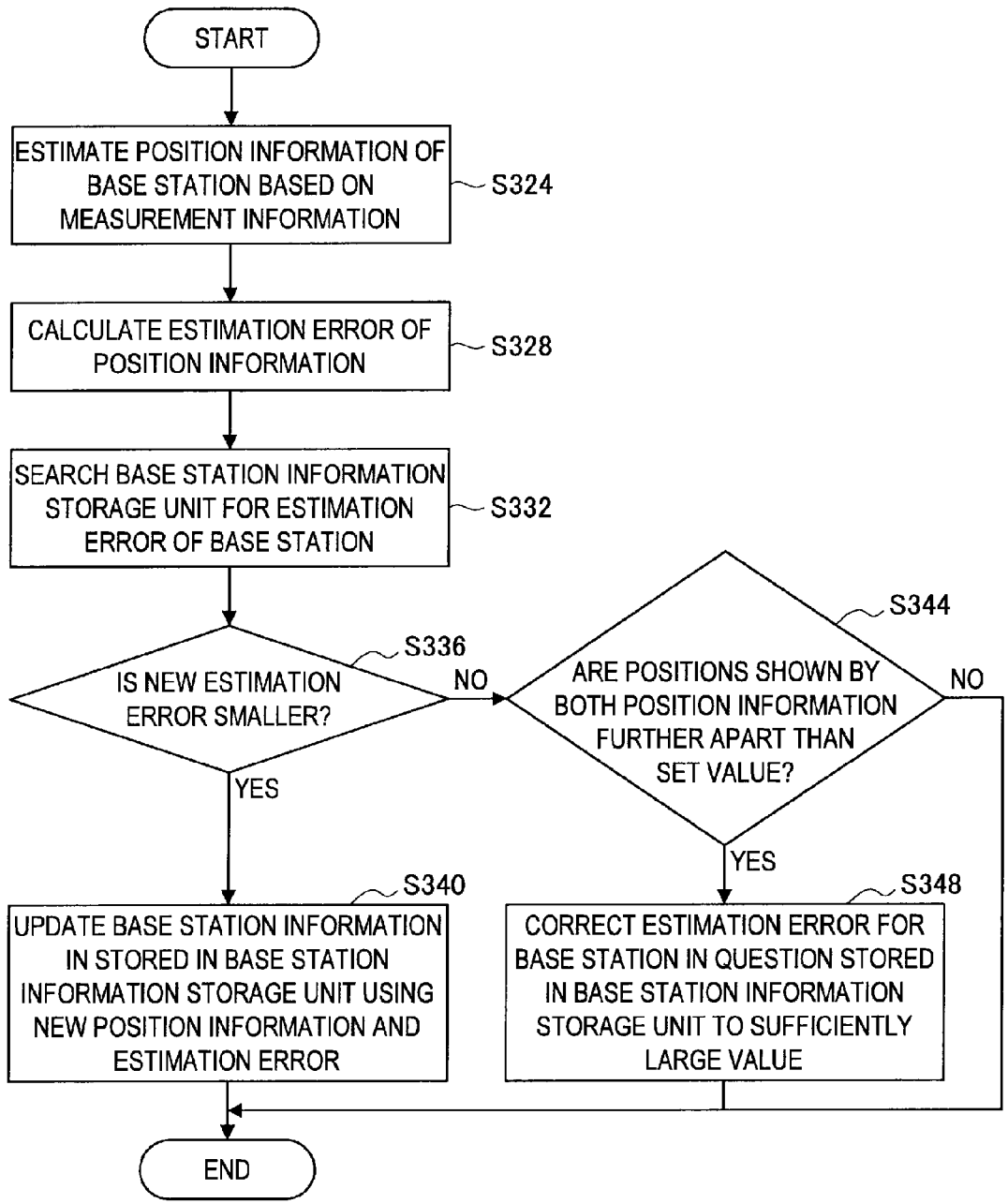
FIG. 16 is a flowchart showing a first example operation of the position estimating apparatus according to the second embodiment.

FIG. 16 is a flowchart showing a first example operation of the position estimating apparatus 20-2 according to the second embodiment. First, as shown in FIG. 16, the base station position estimating unit 224 of the position estimating apparatus 20-2 estimates the position information of a base station 30 based on the measurement information stored in the measurement information storage unit 220 for the base station 30 (S324).

Next, or alternatively in parallel with the position estimation by the base station position estimating unit 224 shown in S324, the estimation error calculating unit 228 calculates an estimation error of the position information estimated by the base station position estimating unit 224 based on the measurement information used in the position estimation by the base station position estimating unit 224 (S328).

In addition, the information management unit 234 searches the base station information storage unit 216 for the position information and the estimation error relating to the base station 30 in question (S332) and compares the found estimation error and the new estimation error calculated by the estimation error calculating unit 228 in S328 (S336).

After this, if the new estimation error is the smaller, the information management unit 234 updates the position information and the estimation error stored in the base station information storage unit 216 using the new position information estimated by the base station position estimating unit 224 in S324 and the new estimation error calculated by the estimation error calculating unit 228 in S328 (S340).

Meanwhile, if the new estimation error is the larger (S336), the information management unit 234 determines whether the positions shown by the position information estimated in S324 and the position information found in S332 are further apart than the set value (S344). If the positions shown by both pieces of position information are further apart than the set value, the information management unit 234 amends the estimation error relating to the base station 30 stored in the base station information storage unit 216 to a sufficiently large value (S348).

Note that the information management unit 234 may amend the estimation error relating to the base station 30 stored in the base station information storage unit 216 to a value in keeping with the magnitude of the difference between the positions shown by both pieces of position information. Also, if the positions shown by both pieces of position information are not further apart than the set value, the content of the base station information storage unit 216 is not changed.

Second Example Operation

Figure 17:
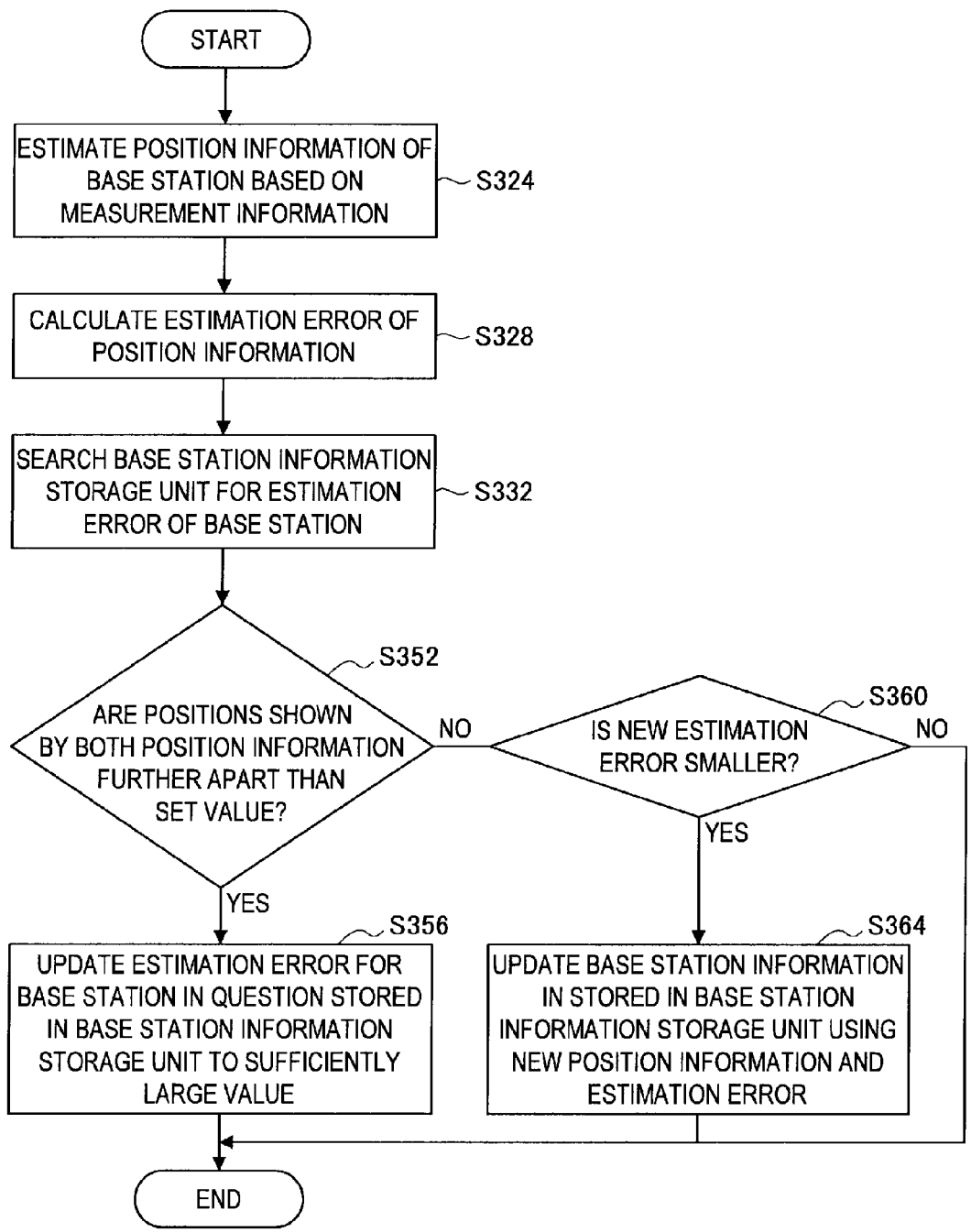
FIG. 17 is a flowchart showing a second example operation of the position estimating apparatus according to the second embodiment.

FIG. 17 is a flowchart showing a second example operation of the position estimating apparatus 20-2 according to the second embodiment. In this second example operation, S324 to S332 are the same as in the first example operation, but the order in which the determinations are made differs to the first example operation.

More specifically, as shown in FIG. 17, once the processing S324 to S332 has been carried out, the information management unit 234 determines whether the positions shown by the position information estimated in S234 and the position information found in S332 are further apart than the set value (S352). If the positions shown by both pieces of position information are further apart than the set value, the information management unit 234 amends the estimation error relating to the base station 30 stored in the base station information storage unit 216 to a sufficiently large value (S356).

Meanwhile, if the positions shown by both pieces of position information are not further apart than the set value, the information management unit 234 compares the estimation error found in S332 and the new estimation error calculated by the estimation error calculating unit 228 in S328 (S360).

After this, if the new estimation error is the smaller, the information management unit 234 updates the position information and the estimation error stored in the base station information storage unit 216 using the new position information estimated by the base station position estimating unit 224 in S324 and the new estimation error calculated by the estimation error calculating unit 228 in S328 (S364).

In this way, even if the order of the branch points in S336 and S344 of the first example operation is interchanged, it is possible to obtain the same effect as the first example operation.

Third Example Operation

Figure 18:
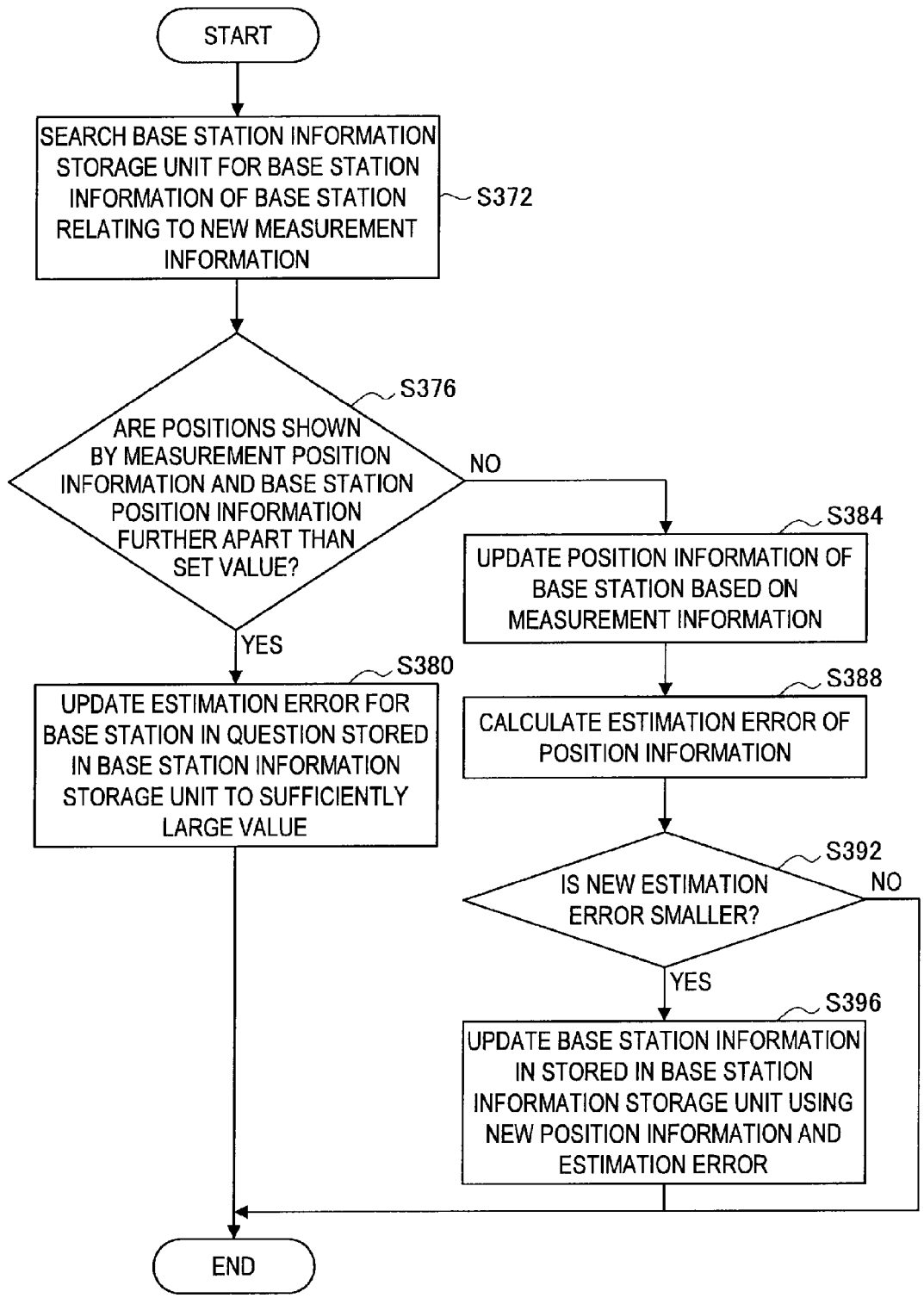
FIG. 18 is a flowchart showing a third example operation of the position estimating apparatus according to the second embodiment.

FIG. 18 is a flowchart showing a third example operation of the position estimating apparatus 20-2 according to the second embodiment. This third example operation greatly differs to the other example operations in that the position for which the determination of whether the difference with the position shown by the position information stored in the base station information storage unit 216 exceeds a set value is made is not the position estimated by the base station position estimating unit 224 based on the measurement information.

More specifically, as shown in FIG. 18, the information management unit 234 searches the base station information storage unit 216 for position information and an estimation error of a base station 30 relating to new measurement information (S372). After this, the information management unit 234 determines whether the position shown by measurement position information included in such measurement information and the position shown by the position information for such base station 30 found in S372 are further apart than a set value (S376).

If the positions shown by both pieces of position information are further apart than the set value, the information management unit 234 amends the estimation error relating to the base station 30 stored in the base station information storage unit 216 to a sufficiently large value (S380). In this way, since it is not necessary for the base station position estimating unit 224 and the estimation error calculating unit 228 to estimate the position and to calculate the estimation error if the positions shown by both pieces of position information are further apart than the set value, it is possible to reduce the load of the position estimating apparatus 20-2.

Meanwhile, if the positions shown by both pieces of position information are not further apart than the set value (S376), the base station position estimating unit 224 estimates the position information of the base station 30 in question based on the measurement information stored in the measurement information storage unit 220 relating to the base station 30 (S384). The estimation error calculating unit 228 also calculates the estimation error of the position information estimated by the base station position estimating unit 224 based on the measurement information used in position estimation by the base station position estimating unit 224 (S388).

Next, the information management unit 234 compares the estimation error found in S372 and the new estimation error calculated by the estimation error calculating unit 228 in S388 (S392). After this, if the new estimation error is the smaller, the information management unit 234 updates the position information and the estimation error stored in the base station information storage unit 216 using the new position information estimated by the base station position estimating unit 224 in S384 and the new estimation error calculated by the estimation error calculating unit 228 in S388 (S396).

As described above, according to the third example operation, by treating a position shown by measurement position information included in the measurement information as an estimated position of a base station 30, it is possible to achieve the same effects as the other example operations while reducing the load of the position estimating apparatus 20-2.

4. Third Embodiment

Position Estimation of Wireless Terminal

The second embodiment of the present disclosure has been described above. Next, a position estimating apparatus 20-3 according to a third embodiment of the present disclosure will be described in detail with reference to FIGS. 19 and 20.

Figure 19:
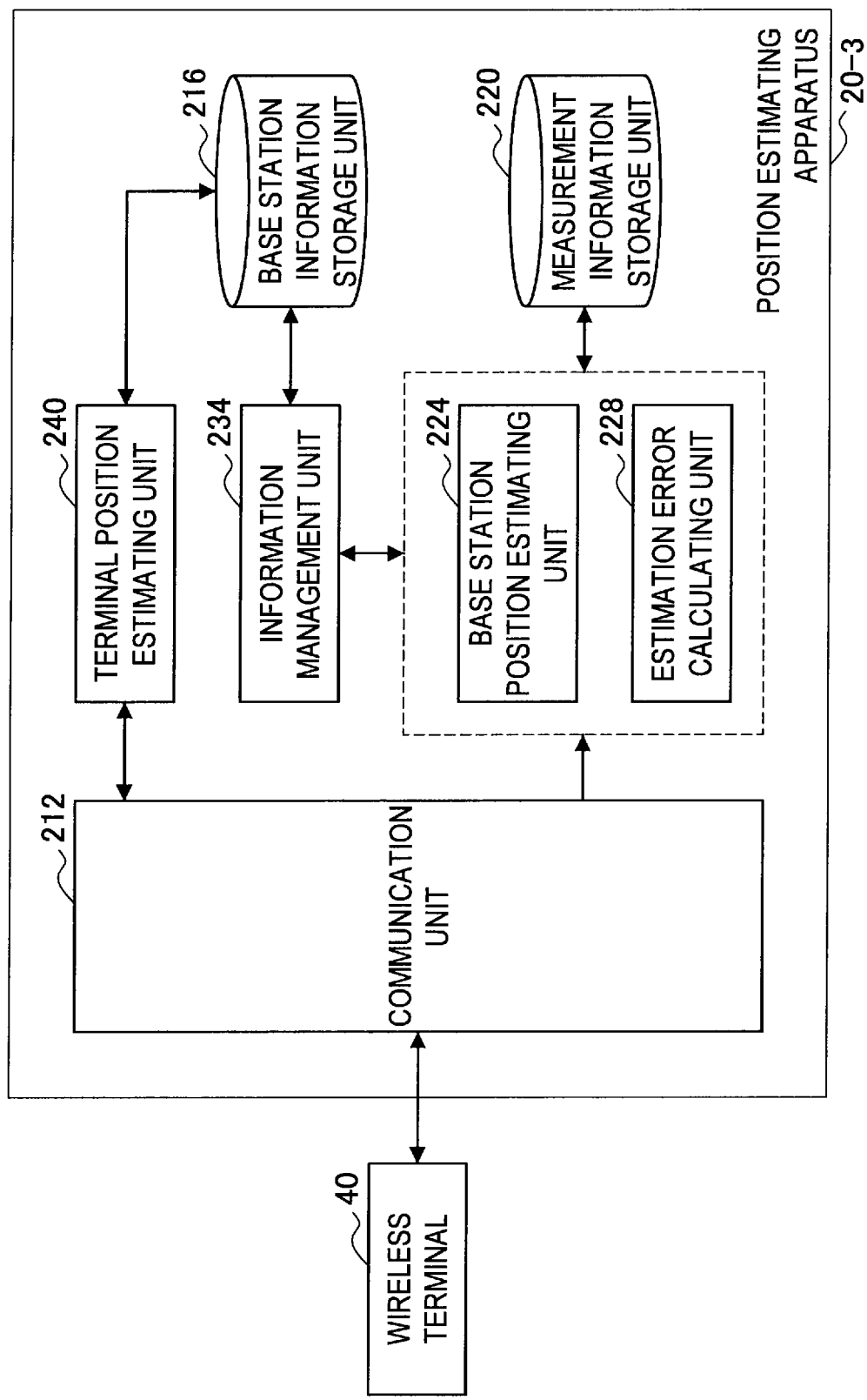
FIG. 19 is a functional block diagram showing the configuration of a position estimating apparatus according to a third embodiment.

4-1. Configuration of Position Estimating Apparatus According to Third Embodiment FIG. 19 is a functional block diagram showing the configuration of the position estimating apparatus 20-3 according to the third embodiment. As shown in FIG. 19, the position estimating apparatus 20-3 according to the third embodiment includes the communication unit 212, the base station information storage unit 216, the measurement information storage unit 220, the base station position estimating unit 224, the estimation error calculating unit 228, the information management unit 234, and a terminal position estimating unit 240.

Since the communication unit 212, the base station information storage unit 216, the measurement information storage unit 220, the base station position estimating unit 224, the estimation error calculating unit 228, and the information management unit 234 are the structural elements described in the second embodiment, detailed description thereof is omitted here.

The terminal position estimating unit 240 estimates position information of a wireless terminal 40 in accordance with a position estimation request transmitted from such wireless terminal 40. The communication unit 212 then transmits the position information of the wireless terminal 40 estimated by the terminal position estimating unit 240 to the wireless terminal 40.

Here, the position estimation request transmitted from the wireless terminal 40 includes signal strength information for each base station 30 obtained by signal strength measurements made at the wireless terminal 40. For example, in the position estimation request, base station IDs and signal strength information are associated with one another.

The terminal position estimating unit 240 estimates position information for the wireless terminal 40 based on such position estimation request and the position information of the respective base stations 30 stored in the base station information storage unit 216. As one example, the terminal position estimating unit 240 estimates the position O of the wireless terminal 40 according to the mathematical formulas shown below.

[Math. 4]

$$O = \frac{1}{W} \cdot \sum_i (Wi \cdot Ai) \quad \text{(Mathematical Formula 4)}$$

[Math. 5]

$$Wi = \frac{1}{distS(O, Ai)} \quad \text{(Mathematical Formula 5)}$$

[Math. 6]

$$W = \sum_i Wi \quad \text{(Mathematical Formula 6)}$$

In Formula 4, "Ai" shows the position information of the $i^{th}$ base station registered in the base station information storage unit 216. Accordingly, when the position information of a base station is expressed by longitude and latitude, the terminal position estimating unit 240 applies Formula 4 separately for longitude and latitude. As shown in Formula 5, "Wi" is a weighting coefficient obtained based on distS (O, Ai) showing the distance between the wireless terminal 40 and the $i^{th}$ base station estimated from the signal strength. Also, as shown in Formula 6, W is the sum of the weighting coefficients.

Note that the method of estimating the position of the wireless terminal 40 is not limited to a method using Formula 4 given above and the terminal position estimating unit 240 may for example use the position of the base station 30 that transmitted the signal with the highest signal strength received by the wireless terminal 40 as an estimate of the position of the wireless terminal 40. Alternatively, the terminal position estimating unit 240 may use a position at the center of the base stations 30 that have transmitted signals received with a signal strength of a specified value or higher by the wireless terminal 40 as an estimate of the position of the wireless terminal 40. It is also possible to realize highly robust estimation of the position by applying a least-squares method.

Here, as described above in the first and second embodiments, position information with a large estimation error in the base station information storage unit 216 has low reliability. Accordingly, it is believed that the precision of position estimation will fall if such position information is used in position estimation for the wireless terminal 40.

For this reason, the terminal position estimating unit 240 may estimate the position of the wireless terminal 40 by selectively using, out of the signal strength information for each base station 30 included in the position estimation request, the signal strength information of base stations 30 where the estimation error of the position information is below a threshold, and also the position information of such base stations 30. According to this configuration, it is possible to improve the precision of position estimation for the wireless terminal 40.

Note that the information management unit 234 may amend the estimation error to a value that is larger than the threshold mentioned above during the processing shown in S348 of FIG. 16 and S356 of FIG. 17. According to this configuration, it is possible to prevent position information of a base station 30 with a high possibility of having moved from being used when estimating the position of the wireless terminal 40.

4-2. Operation of the Third Embodiment

The configuration of the position estimating apparatus 20-3 according to the third embodiment of the present disclosure has been described above. Next, an example operation of an information processing system according to the third embodiment will be described with reference to FIG. 20.

Figure 20:
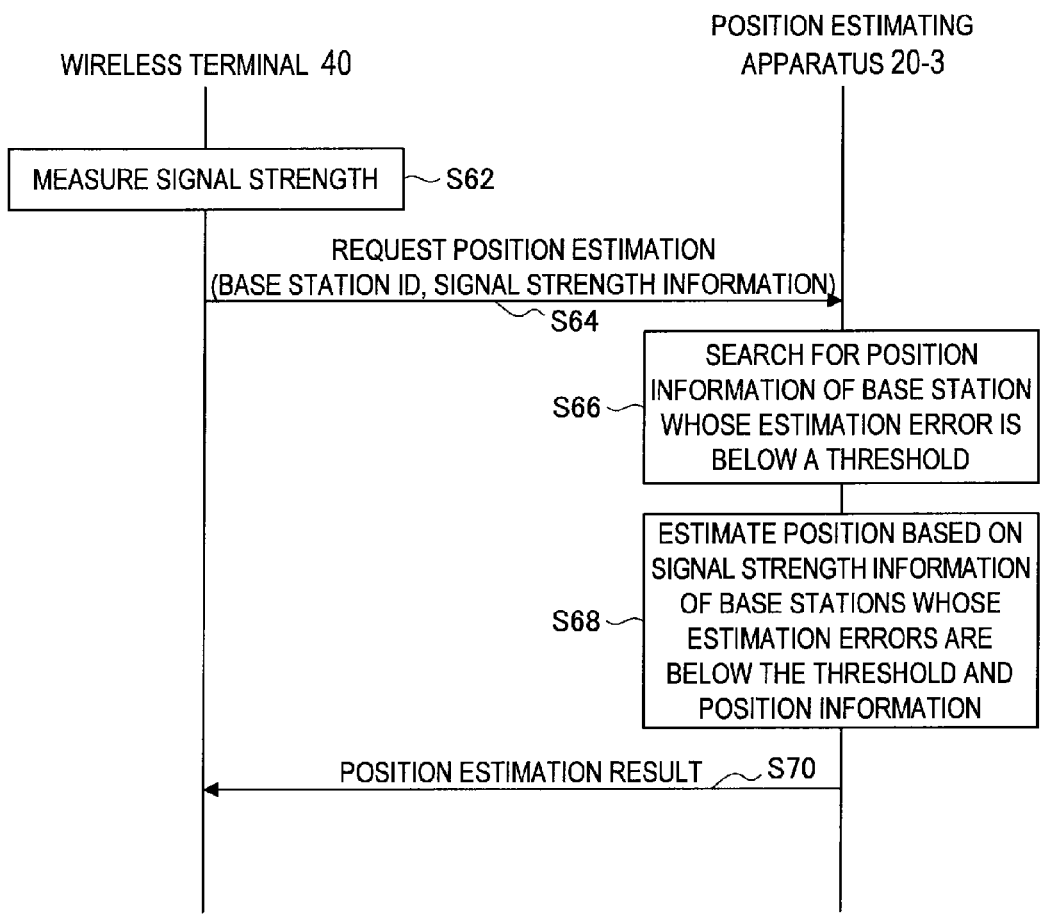
FIG. 20 is a sequence chart showing an example operation of an information processing system according to the third embodiment.

FIG. 20 is a sequence chart showing an example operation of the information processing system according to the third embodiment. As shown in FIG. 20, after carrying out signal strength measurement on wireless signals transmitted from base stations 30 in the periphery (S62), the wireless terminal 40 transmits a position estimation request including signal strength information for each base station 30 obtained by such signal strength measurement to the position estimating apparatus 20-3 (S64).

Next, the terminal position estimating unit 240 of the position estimating apparatus 20-3 searches the base station information storage unit 216 for position information of base stations 30, out of the signal strength information for each base station 30 included in the position estimation request, for which the estimation error of the position information is below a threshold (S66). In addition, the terminal position estimating unit 240 estimates the position of the wireless terminal 40 based on the position information and signal strength information of the base stations 30 where the estimation error of the position information is below the threshold (S68).

After this, the communication unit 212 of the position estimating apparatus 20-3 transmits the position estimation result produced by the terminal position estimating unit 240 to the wireless terminal 40 (S70).

As described above, according to the third embodiment of the present disclosure, it is possible to use the position information of base stations 30 that has been appropriately updated to estimate the position of a wireless terminal 40. Accordingly, the precision of position estimation for a wireless terminal 40 can be improved.

5. Fourth Embodiment

Determining Mobile Base Stations

The third embodiment of the present disclosure has been described above. Next, a position estimating apparatus 20-4 according to a fourth embodiment of the present disclosure will be described in detail with reference to FIGS. 21 to 24.

Figure 21:
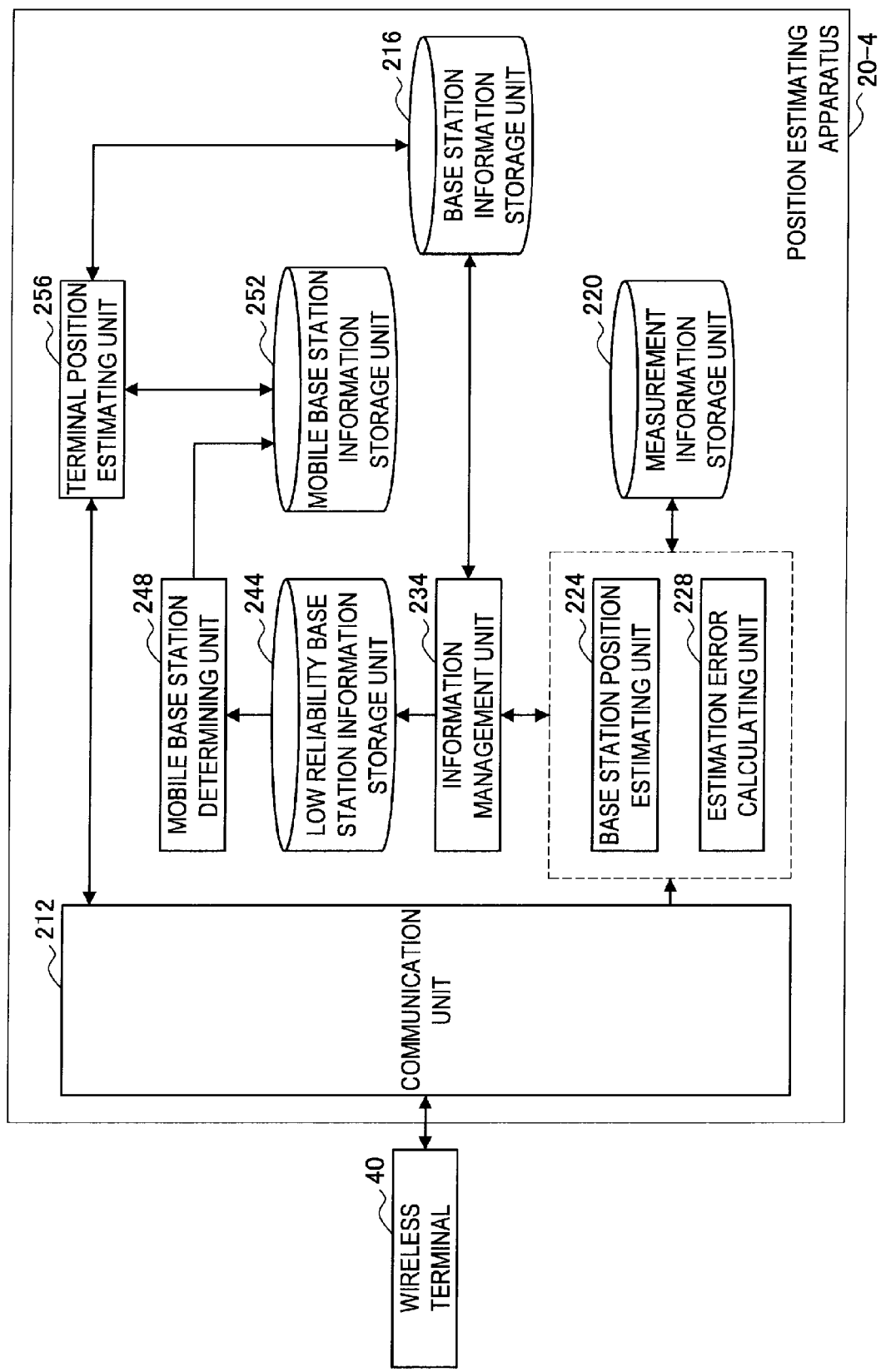
FIG. 21 is a functional block diagram showing the configuration of a position estimating apparatus according to a fourth embodiment.

5-1. Configuration of Position Estimating Apparatus According to Fourth Embodiment FIG. 21 is a functional block diagram showing the configuration of the position estimating apparatus 20-4 according to the fourth embodiment. As shown in FIG. 21, the position estimating apparatus 20-4 according to the fourth embodiment includes the communication unit 212, the base station information storage unit 216, the measurement information storage unit 220, the base station position estimating unit 224, the estimation error calculating unit 228, the information management unit 234, a low reliability base station information storage unit 244, a mobile base station determining unit 248, a mobile base station information storage unit 252, and a terminal position estimating unit 256.

Since the communication unit 212, the base station information storage unit 216, the measurement information storage unit 220, the base station position estimating unit 224, the estimation error calculating unit 228, and the information management unit 234 are the structural elements described in the first to third embodiments, detailed description thereof is omitted here.

As described above in the second embodiment, the information management unit 234 determines whether the difference between the estimated position of a base station 30 based on the measurement information received from the wireless terminal 40 and the position shown by position information stored in the base station information storage unit 216 for such base station 30 exceeds a set value. If the difference between both positions exceeds the set value, the information management unit 234 lowers the reliability of the position information stored in the base station information storage unit 216 for the base station 30 in question. That is, if the difference between both positions exceeds the set value, the information management unit 234 increases the value of the estimation error stored in the base station information storage unit 216 for the base station 30 in question.

Accordingly, the estimation error of the base station 30 is amended mainly when the base station 30 has moved. For this reason, there is the possibility that a base station 30 whose estimation error has been corrected is a mobile base station carried by the user. However, there are also cases where even a home base station will have moved due to movement of the user. For this reason, in the present embodiment, it is specified whether the base station 30 is a mobile base station based on the frequency with which, or the number of times that, the estimation error of such base station 30 has been amended.

When the estimation error of a base station 30 stored in the base station information storage unit 216 is amended, such base station 30 will have low reliability as a fixed base station, and accordingly the information management unit 234 adds the base station ID showing such base station to the low reliability base station information storage unit 244. Here, specific examples of low reliability base station information stored in the low reliability base station information storage unit 244 will be described with reference to FIG. 22.

Figures 22, 23:
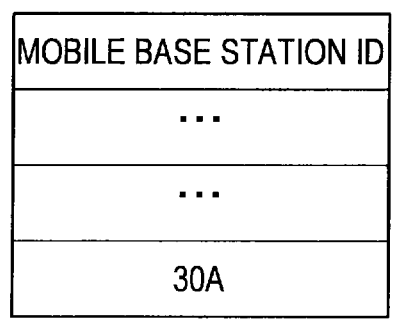
FIG. 22 is a diagram useful in showing specific examples of low reliability base station information stored in a low reliability base station information storage unit.
FIG. 23 is a diagram useful in showing a specific example of mobile base station information stored in a mobile base station information storage unit.

FIG. 22 is a diagram useful in showing specific examples of the low reliability base station information stored in the low reliability base station information storage unit 244. As shown in FIG. 22, the low reliability base station information storage unit 244 stores base station IDs showing low reliability base stations in association with report times showing when such base stations were reported (added) as low reliability base stations. For example, in FIG. 22, it is shown that the base station 30A was reported as a low reliability base station at "2010/7/14 10:34:56". In this way, the low reliability base station information storage unit 244 functions as a history information storage unit that stores history information for each piece of low reliability base station information that has been reported.

Here, it is conceivable that a home base station would be stored in the information storage unit 244 as a low reliability base station as a result of the user moving house. However, it is hard to imagine a case where the user will move house several times in a short period, for example.

For this reason, the mobile base station determining unit 248 refers to the low reliability base station information storage unit 244 and determines that a base station 30 that has been reported as a low reliability base station with high frequency is a mobile base station. For example, the mobile base station determining unit 248 may determine that a base station 30 that has been reported as a low reliability base station more than a set number of times, such as twice, five times, or ten times within a specified period, such as one week, one month, or three months, is a mobile base station.

In more detail, for the example shown in FIG. 22, since the base station 30A has been reported as a low reliability base station four times in the period from "2010/7/14" to "2010/7/18", the mobile base station determining unit 248 may determine that the base station 30A is a mobile base station.

Information on the base station 30 determined by the mobile base station determining unit 248 to be a mobile base station is added to the mobile base station information storage unit 252. For example, when the base station 30A has been determined to be a mobile base station by the mobile base station determining unit 248, as shown in FIG. 23, the base station ID of the base station 30A is added to the mobile base station information storage unit 252. Note that the base station ID may be added to the mobile base station information storage unit 252 in an offline manner based on a base station ID reported by the user and/or information reported from a vendor or carrier.

The information on the base station 30 determined by the mobile base station determining unit 248 to be a mobile base station may be deleted from the base station information storage unit 216. For example, when the base station 30A has been determined by the mobile base station determining unit 248 to be a mobile base station, the base station information, such as the position information and the estimation error, of the base station 30A may be deleted from the base station information storage unit 216.

Since a mobile base station is not present at a fixed location as described above, if information on such a mobile base station were used when estimating the position of a wireless terminal 40, there would be the risk of a fall in the precision of the position estimation.

For this reason, the terminal position estimating unit 256 may estimate the position of the wireless terminal 40 by selectively using, out of the signal strength information for each base station 30 included in the position estimation request from the wireless terminal 40, signal strength information of base stations 30 not stored in the mobile base station information storage unit 252 as mobile base stations, and also the position information of such base stations 30. According to this configuration, it is possible to improve the precision of position estimation for a wireless terminal 40.

5-2. Operation of Position Estimating Apparatus According to Fourth Embodiment

The configuration of the position estimating apparatus 20-4 according to the fourth embodiment of the present disclosure has been described above. Next, an example operation of the position estimating apparatus 20-4 according to the fourth embodiment will be described with reference to FIG. 24.

Figure 24:
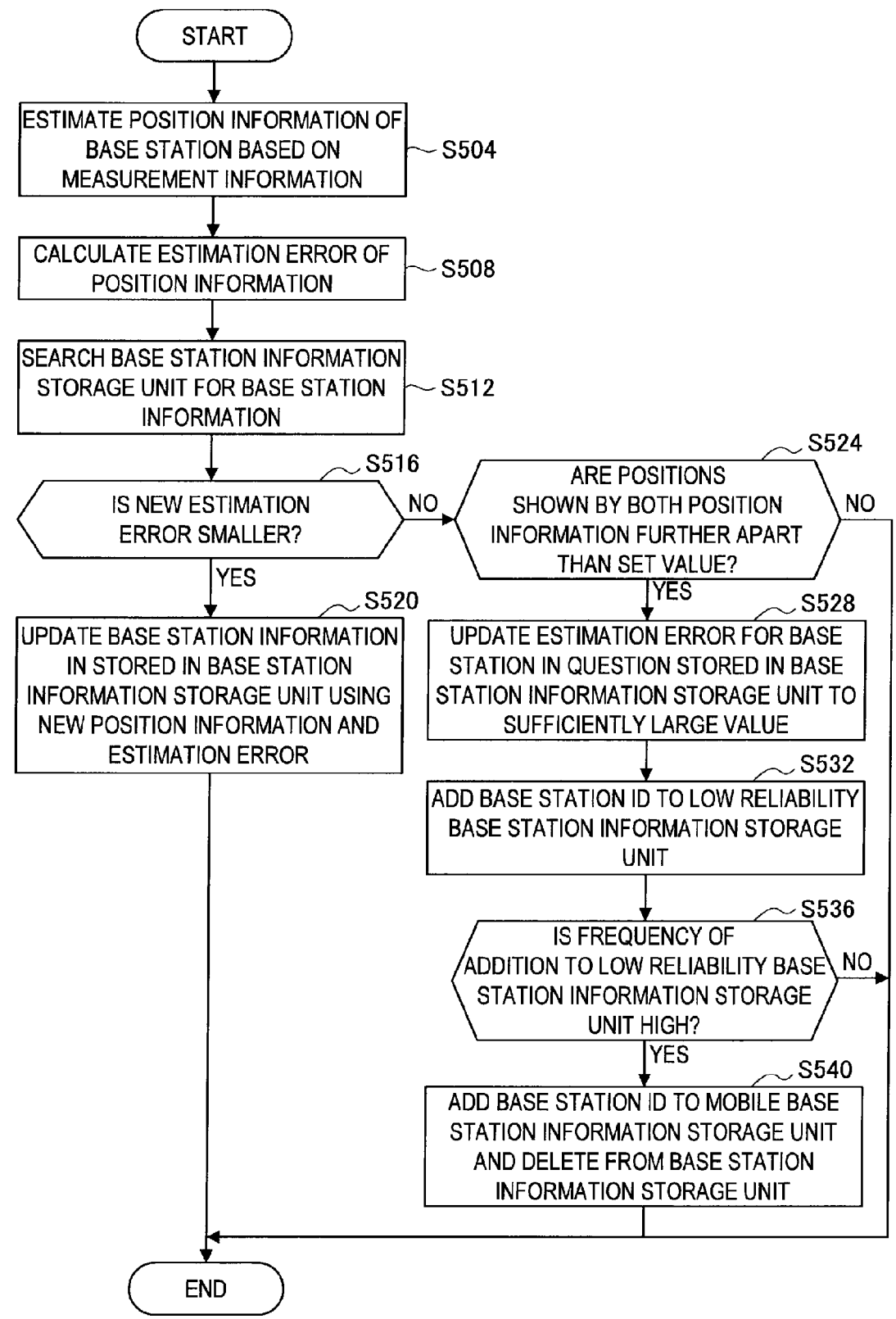
FIG. 24 is a flowchart showing an example operation of a position estimating apparatus according to the fourth embodiment.

FIG. 24 is a flowchart showing an example operation of the position estimating apparatus 20-4 according to the fourth embodiment. First, as shown in FIG. 24, the base station position estimating unit 224 of the position estimating apparatus 20-4 estimates the position information of a base station 30 based on the measurement information stored in the measurement information storage unit 220 for such base station 30 (S504).

Next, or alternatively in parallel with the position estimation by the base station position estimating unit 224 shown in S504, the estimation error calculating unit 228 calculates an estimation error of the position information estimated by the base station position estimating unit 224 based on the measurement information used in the position estimation by the base station position estimating unit 224 (S508).

In addition, the information management unit 234 searches the base station information storage unit 216 for position information and an estimation error relating to the base station 30 in question (S512) and compares the found estimation error and the new estimation error calculated by the estimation error calculating unit 228 in S508 (S516).

After this, if the new estimation error is the smaller, the information management unit 234 updates the position information and the estimation error stored in the base station information storage unit 216 using the new position information estimated by the base station position estimating unit 224 in S504 and the new estimation error calculated by the estimation error calculating unit 228 in S508 (S520).

Meanwhile, if the new estimation error is the larger (S516), the information management unit 234 determines whether the positions shown by the position information estimated in S504 and the position information found in S512 are further apart than a set value (S524). If the positions shown by both pieces of position information are further apart than the set value, the information management unit 234 amends the estimation error relating to the base station 30 stored in the base station information storage unit 216 to a sufficiently large value (S528).

In addition, the information management unit 234 adds the base station ID of the base station 30 whose estimation error has been amended to a large value to the low reliability base station information storage unit 244 (S532). After this, the mobile base station judging unit 248 refers to the low reliability base station information storage unit 244 and determines that a base station 30 that has been added to the low reliability base station information storage unit 244 with a high frequency is a mobile base station (S536).

Next, a base station ID showing the base station 30 determined by the mobile base station judging unit 248 to be a mobile base station is added to the mobile base station information storage unit 252 and the information relating to the base station 30 in question is deleted from the base station information storage unit 216 (S540).

As described above, according to the fourth embodiment, it is possible to determine mobile base stations. This means that it becomes possible for the terminal position estimating unit 256 to estimate the position of a wireless terminal 40 by selectively using, out of the signal strength information for each base station 30 included in the position estimation request from the wireless terminal 40, the signal strength information of base stations 30 not stored in the mobile base station information storage unit 252 as mobile base stations, and also the position information of such base stations 30. According to this configuration, it is possible to improve the precision of position estimation for a wireless terminal 40.

6. Fifth Embodiment

Implementing Functions in Mobile Terminal

First to fourth embodiments of the present disclosure have been described above. In the first to fourth embodiments of the present disclosure, examples have been described where a function for updating base station information, a position estimating function for a wireless terminal 40, a determining function for mobile base stations, and the like are implemented in a position estimating apparatus 20. However, as described below in the fifth embodiment, it is also possible to implement such functions in a wireless terminal 40.

Figure 25:
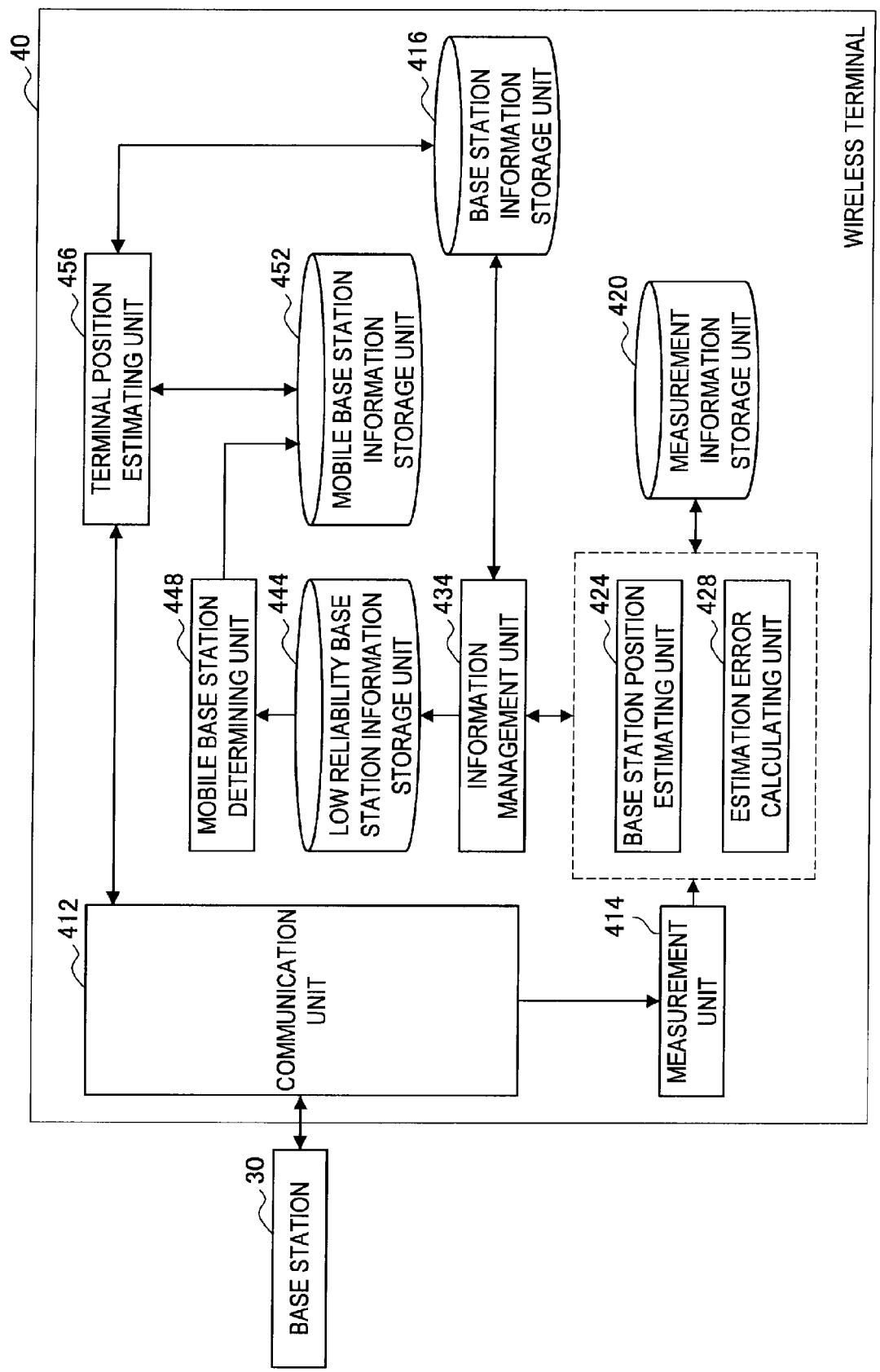
FIG. 25 is a functional block diagram showing the configuration of a wireless terminal according to a fifth embodiment.

FIG. 25 is a functional block diagram showing the configuration of a wireless terminal 40 according to the fifth embodiment. As shown in FIG. 25, the wireless terminal 40 according to the fifth embodiment includes a communication unit 412, a measurement unit 414, a base station information storage unit 416, a measurement information storage unit 420, a base station position estimating unit 424, an estimation error calculating unit 428, an information management unit 434, a low reliability base station information storage unit 444, a mobile base station judging unit 448, a mobile base station information storage unit 452, and a terminal position estimating unit 456.

The communication unit 412 is an interface for base stations 30 in the periphery of the wireless terminal 40 and functions as a reception unit that receives wireless signals transmitted from the base stations 30 and as a transmission unit that transmits wireless signals to the base stations 30.

The measurement unit 414 measures, for each transmitting base station 30, the signal strength of wireless signals received by the communication unit 412 from such base stations 30. By measuring the signal strength using the measurement unit 414, as one example measurement information such as that described with reference to FIG. 2 is obtained.

The other functional blocks numbered 416 to 456 of the wireless terminal 40 according to the fifth embodiment can have effectively the same configurations as the base station information storage unit 216, the measurement information storage unit 220, the base station position estimating unit 224, the estimation error calculating unit 228, the information management unit 234, the low reliability base station information storage unit 244, the mobile base station judging unit 248, the mobile base station information storage unit 252, and the terminal position estimating unit 256 described in the fourth embodiment, and therefore detailed description thereof is omitted here.

In short, the measurement information obtained by the measurement unit 414 is stored in the measurement information storage unit 420 and based on such measurement information, the base station position estimating unit 424 and the estimation error calculating unit 428 calculate the position information and the estimation error of a base station 30. The information management unit 434 then updates the base station information stored in the base station information storage unit 416 in accordance with the relationship between the position information and the estimation error obtained by the base station position estimating unit 424 and the estimation error calculating unit 428 and the base station information stored in the base station information storage unit 416.

Also, base station IDs showing base stations 30 that have low reliability as fixed base stations are recorded in the low reliability base station information storage unit 444 and the mobile base station judging unit 448 determines mobile base stations by referring to the low reliability base station information storage unit 444. Information relating to a base station 30 determined by the mobile base station judging unit 448 to be a mobile base station is added to the mobile base station information storage unit 452 and is deleted from the base station information storage unit 416. Note that it is also possible for the user to manually set a list of base stations 30 used in position estimation.

Based on the signal strength information for each base station 30 obtained by the measurement unit 414, the terminal position estimating unit 456 estimates the position of the wireless terminal 40. When doing so, the terminal position estimating unit 456 estimates the position of the wireless terminal 40 by selectively using, out of the signal strength information for each base station 30 obtained by the measurement unit 414, the signal strength information of base stations 30 that are not stored in the mobile base station information storage unit 452 as mobile base stations, and also the position information of such base stations 30. According to this configuration, it is possible to improve the precision of position estimation for the wireless terminal 40.

7. Conclusion

As described above, according to the first embodiment of the present disclosure, in accordance with the relationship between the estimation error stored in the base station information storage unit 216 and an estimation error that has been newly calculated, it is possible to progressively update the position information of each base station 30 stored in the base station information storage unit 216 to more reliable values.

Also, according to the second embodiment of the present disclosure, if a base station 30 has moved after the position information of such base station 30 has been estimated with a small estimation error, such estimation error is amended to a large value by the information management unit 234. As a result, since it becomes easier for a new estimation error calculated by the estimation error calculating unit 228 after movement to become smaller than the stored value, it becomes possible for the information management unit 234 to update the position information of the base station 30 stored in the base station information storage unit 216 to new position information estimated by the base station position estimating unit 224 after movement.

Also, according to the third embodiment of the present disclosure, it is possible to estimate the position of the wireless terminal 40 by selectively using, out of the signal strength information for each base station 30 included in a position estimation request, the signal strength information of base stations where the estimation error of the position information is below a threshold, and also the position information of such base stations 30.

Also, according to the fourth embodiment of the present disclosure, it is possible to determine whether a base station 30 is a mobile base station based on the frequency with which such base station 30 has been reported as a low reliability base station. This means that it is possible for the terminal position estimating unit 256 to estimate the position of a wireless terminal 40 by selectively using, out of the signal strength information for each base station 30 included in a position estimation request from the wireless terminal 40, the signal strength information of base stations 30 that are not stored in the mobile base station information storage unit 252 as mobile base stations, and also the position information of such base stations 30.

Also, as described in the fifth embodiment of the present disclosure, it is possible to implement functions such as the updating function for the base station information, the position estimating function for a wireless terminal 40, the determining function for mobile base stations, and the like described in the first to fourth embodiments in a wireless terminal 40.

Although preferred embodiments of the present disclosure have been described in detail with reference to the attached drawings, the present disclosure is not limited to the above examples. It should be understood by those skilled in the art that various modifications, combinations, sub-combinations and alterations may occur depending on design requirements and other factors insofar as they are within the scope of the appended claims or the equivalents thereof.

As one example, the respective steps in the processing of the position estimating apparatus 20 and the wireless terminal 40 in this specification do not need to be carried out in a time series in the order in which such steps are given in the sequence charts or flowcharts. For example, the respective steps in the processing of the position estimating apparatus 20 may be carried out in a different order to the order written in the flowcharts and/or may be carried out in parallel.

It is also possible to produce a computer program for causing hardware such as a CPU, a ROM, and a RAM incorporated in the position estimating apparatus 20 and the wireless terminal 40 to achieve the same functions as the respective structural elements of the position estimating apparatus 20 and the wireless terminal 40 described earlier. A storage medium on which such computer program is recorded may also be provided.

REFERENCE SIGNS LIST 20, 20-1, 20-2, 20-3, 20-4 Position estimating apparatus
30, 30A, 30B, 30C Base station
40 Wireless terminal
212, 412 Communication unit
216, 416, Base station information storage unit
220, 420 Measurement information storage unit
224, 424 Base station position estimating unit
228, 428 Estimation error calculating unit
232, 234, 434 Information management unit
240, 256, 456 Terminal position estimating unit
244, 444 Low reliability base station information storage unit
248, 448 Mobile base station judging unit
252, 452 Mobile base station information storage unit
414 Measurement unit

The invention claimed is:

1. An information processing apparatus comprising:
circuitry configured to:
estimate position information of a base station based on signal strength measurement information collected from wireless signals transmitted from a plurality of base stations;
determine a determined index corresponding to reliability of an estimated position information for the base station;
update a stored base station position information using the estimated position information when the determined index indicates a higher reliability than a stored index for the base station; and
lower the stored index lower to indicate lower reliability when a difference between the estimated position information and stored base station position information exceeds a predetermined value.

2. The apparatus according to claim 1, wherein the circuitry is configured to:
receive from a wireless terminal signal strength measurement information; and
store for the base station
the stored base station position information, and
the stored index.

3. The apparatus according to claim 2, wherein the circuitry is configured to:
  store the received signal strength measurement information.

4. The apparatus according to claim 3, wherein the circuitry is configured to:
  refer to the stored signal strength measurement information and estimate the estimated position information of the base station based on magnitudes of signals strengths of received wireless signals.

5. The apparatus according to claim 4, wherein the circuitry is configured to:
  calculate an average of the signal strengths of the received wireless signals.

6. The apparatus according to claim 5, wherein the circuitry is configured to:
  store history information for base stations having changes to the stored index to reflect lowered reliability;
  determine whether the base station is a mobile base station based on the history information; and
  store information regarding base stations that have been determined to be mobile base stations.

7. The apparatus according to claim 6, wherein the circuitry is configured to:
  determine that the base station is a mobile base station where the reliability of the stored index has been lowered with a specified frequency or made higher.

8. The apparatus according to according to claim 6, wherein the circuitry is configured to:
  estimate a position of a wireless terminal based on measurement information received from the wireless terminal and the stored base station position information, and
  estimate the position of the wireless terminal using measurement results of base stations where the reliability exceeds a predetermined threshold.

9. The apparatus according to claim 8, wherein the circuitry is further configured to:
  estimate the position of the wireless terminal using measurement results of base stations whose reliability exceeds the threshold and are not stored as mobile base stations.

10. The apparatus according to claim 8, wherein the circuitry is configured to:
  lower the stored index to the predetermined threshold or below when a difference between an estimated position of the base station and a position shown by the stored base station position information exceeds a set value.

11. An information processing method comprising:
  estimating position information of a base station based on signal strength measurement information collected from wireless signals transmitted from a plurality of base stations;
  determining with a processor a determined index corresponding to reliability of an estimated position information for the base station;
  updating in a computer readable storage device a stored base station position information using the estimated position information when the determined index indicates a higher reliability than a stored index for the base station; and
  changing the stored index lower to indicate lower reliability when a difference between the estimated position information and stored base station position information exceeds a predetermined value.

12. The method according to claim 11, further comprising:
  receiving from a wireless terminal signal strength measurement information; and
  storing in a base station information storage unit
    the stored base station position information, and
    the stored index.

13. The method according to claim 11, wherein:
  the estimating includes estimating the estimated position information of the base station based on magnitudes of signals strengths described by the signal strength measurement information.

14. The method according to claim 13, further comprising:
  storing history information for base stations having changes to the stored index to reflect lowered reliability;
  determining whether the base station is a mobile base station based on the history information; and
  storing information regarding base stations that have been determined to be mobile base stations.

15. A computer readable storage device having instructions that when executed by a processor perform a method comprising:
  estimating position information of a base station based on wireless terminal signal strength measurement information of wireless signals transmitted from a plurality of base stations;
  determining with a processor a determined index corresponding to an estimated position information for the base station;
  updating in a computer readable storage device a stored base station position information using the estimated position information when the determined index indicates a higher reliability than a stored index for the base station; and
  changing the stored index lower to indicate lower reliability when a difference between the estimated position information and stored base station position information exceeds a predetermined value.

16. The computer readable storage device of claim 15, wherein the method further comprising:
  receiving from a wireless terminal signal strength measurement information; and
  storing in a base station information storage unit
    the stored base station position information, and
    the stored index.

17. The computer readable storage device of claim 15, wherein
  the estimating includes estimating the estimated position information of the base station based on magnitudes of signals strengths described by the signal strength measurement information.

* * * * *